United States Patent
Ko et al.

(10) Patent No.: US 10,349,419 B2
(45) Date of Patent: *Jul. 9, 2019

(54) METHOD AND APPARATUS FOR PROVIDING DOWNLINK CONTROL INFORMATION IN A MIMO WIRELESS COMMUNICATION SYSTEM

(71) Applicant: LG ELECTRONICS INC., Seoul (KR)

(72) Inventors: Hyun Soo Ko, Anyang-si (KR); Jae Hoon Chung, Anyang-si (KR); Bin Chul Ihm, Anyang-si (KR); Moon Il Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 25 days.

This patent is subject to a terminal disclaimer.

(21) Appl. No.: 15/808,700

(22) Filed: Nov. 9, 2017

(65) Prior Publication Data

US 2018/0070351 A1    Mar. 8, 2018

Related U.S. Application Data

(63) Continuation of application No. 14/797,560, filed on Jul. 13, 2015, now Pat. No. 9,854,583, which is a (Continued)

(30) Foreign Application Priority Data

Jan. 24, 2011    (KR) .................. 10-2011-0006755

(51) Int. Cl.
H04W 72/04    (2009.01)
H04B 1/707    (2011.01)
(Continued)

(52) U.S. Cl.
CPC .......... *H04W 72/048* (2013.01); *H04B 1/707* (2013.01); *H04B 7/0413* (2013.01);
(Continued)

(58) Field of Classification Search
CPC .... H04B 7/0413; H04B 7/0665; H04B 1/707; H04B 2201/70701; H04B 7/0452;
(Continued)

(56) References Cited

U.S. PATENT DOCUMENTS 7,864,738 B2    1/2011   Kaikkonen et al. .......... 370/334
8,218,663 B2    7/2012   Muharemovic et al. ..... 375/260
(Continued)

FOREIGN PATENT DOCUMENTS

CN    101375570 A    2/2009
CN    101605375 A    12/2009
(Continued)

OTHER PUBLICATIONS

Nokia, Nokia Siemens Networks: "DL Control Signalling for Dual-layer Beamforming in Rel'9", 3GPP TSG RAN WG1 Meeting #58bis, R1-093892, Oct. 12-16, 2009.
(Continued)

*Primary Examiner* — Steven H Nguyen
(74) *Attorney, Agent, or Firm* — Denton US LLP

(57) ABSTRACT

The present invention relates to a method in which a user equipment receives a downlink signal from a base station in a wireless communication system that supports downlink mimo transmission according to one embodiment of the present invention comprises: receiving downlink control information that includes information indicative of the number of layers (n, 1≤n≤8) where one or two enabled code words of the downlink mimo transmission are mapped; on the basis of the downlink control information, receiving downlink data transmitted over the respective n layers and a
(Continued)

ue-specific reference signal for each of the n layers; and decoding the downlink data on the basis of the ue-specific reference signals, wherein the information indicative of the number of layers can further include information on a code for identifying the ue-specific reference signals.

20 Claims, 9 Drawing Sheets

Related U.S. Application Data continuation of application No. 13/522,270, filed as application No. PCT/KR2011/000480 on Jan. 24, 2011, now Pat. No. 9,112,552.

(60) Provisional application No. 61/297,430, filed on Jan. 22, 2010.

(51) Int. Cl.
*H04B 7/0413* (2017.01)
*H04L 5/00* (2006.01)
*H04B 7/0452* (2017.01)
*H04B 7/06* (2006.01)

(52) U.S. Cl.
CPC .......... *H04L 5/0007* (2013.01); *H04L 5/0051* (2013.01); *H04L 5/0053* (2013.01); *H04B 7/0452* (2013.01); *H04B 7/0665* (2013.01); *H04B 2201/70701* (2013.01)

(58) Field of Classification Search
CPC ... H04B 7/0473; H04L 5/0007; H04L 5/0051; H04L 5/0053; H04W 72/048; H04W 48/12

See application file for complete search history.

(56) References Cited

U.S. PATENT DOCUMENTS

| 8,245,092 | B2 | 8/2012 | Kotecha et al. ............. 714/748 |
| 8,412,999 | B2 | 4/2013 | Lee et al. .................... 714/748 |
| 9,025,688 | B2 | 5/2015 | Ko ...................... H04B 7/0639 375/267 |
| 9,112,552 | B2* | 8/2015 | Ko ...................... H04B 7/0413 |
| 9,854,583 | B2* | 12/2017 | Ko ...................... H04B 7/0413 |
| 2006/0128309 | A1 | 6/2006 | Dateki ................. H04B 7/0613 455/41.3 |
| 2007/0191066 | A1 | 8/2007 | Khojastepour et al. ... 455/562.1 |
| 2007/0274411 | A1 | 11/2007 | Lee et al. ...................... 375/267 |
| 2008/0013610 | A1 | 1/2008 | Varadarajan et al. ........ 375/221 |
| 2008/0186934 | A1* | 8/2008 | Khan ..................... H04L 1/0046 370/342 |
| 2008/0212701 | A1 | 9/2008 | Pan ....................... H04B 7/0417 375/260 |
| 2009/0067522 | A1 | 3/2009 | Kwak et al. |
| 2010/0034312 | A1 | 2/2010 | Muharemovic ..... H04L 27/2613 375/267 |
| 2010/0284351 | A1 | 11/2010 | Liang et al. .................. 370/329 |
| 2010/0303034 | A1 | 12/2010 | Chen ..................... H04L 5/0023 370/329 |
| 2011/0176502 | A1 | 7/2011 | Chung ................. H04W 72/042 370/329 |
| 2012/0201282 | A1 | 8/2012 | Li et al. ......................... 375/219 |
| 2012/0219091 | A1 | 8/2012 | Li et al. ......................... 375/296 |

FOREIGN PATENT DOCUMENTS

| CN | 101615937 A | 12/2009 |
| KR | 1020090017973 A | 2/2009 |
| WO | 2005125140 A1 | 12/2005 |

OTHER PUBLICATIONS

TD Tech: "On control signalling for supporting the Dual-Layer Beamforming", 3GPP TSG RAN WG1 Meeting #58bis, R1-094345, Oct. 12-16, 2009.
Huawei: "Control signalling for MU-MIMO", 3GPP TSG RAN WG1#59bis, R1-100249, Jan. 18-22, 2010.
CATT: "Discussion on precoding granularity for downlink MIMO", 3GPP TSG RAN WG1 Meeting #57bis, R1-092794, Jun. 29-Jul. 3, 2009.
Huawei: "Downlink control signalling for dual-layer beamforming", 3GPP TSG RAN WG1 Meeting #58, R1-093027, Aug. 24-28, 2009.
M. Tanno, et al., "Evolved UTR—Physical layer overview", 2007 IEEE 8th Workshop on Signal Processing Advances in Wireless Communications (SPAWC 2007), pp. 1-8, Jun. 20, 2007.
A. Ghosh, et al., "Multi-antenna systems for LTE eNodeB," 2009 IEEE 70th Vehicular Technology Conference Fall (VTC 2009—Fall), pp. 1-4, Sep. 23, 2009.
J. Lee, et al., "MIMO Technologies in 3GPP LTE and LTE-Advanced", EURASIP Journal on Wireless Communications and Networking, vol. 2009, pp. 1-10, Dec. 31, 2009.
R1-093408: 3GPP TSG RAN WG1 #58, Shenzhen, China, Aug. 24-28, 2009, "Control Signaling for LTE Rel-9 Enhanced DL transmission," Motorola, (Aug. 19, 2009) pp. 1-7.

* cited by examiner (a)

(b)

(a)

(b)

METHOD AND APPARATUS FOR PROVIDING DOWNLINK CONTROL INFORMATION IN A MIMO WIRELESS COMMUNICATION SYSTEM

This application is a Continuation of U.S. application Ser. No. 14/797,560, filed Jul. 13, 2015, which is a Continuation of U.S. application Ser. No. 13/522,270 filed Jul. 13, 2012, which is a 35 USC § 371 National Stage entry of International Application No. PCT/KR2011/000480, filed on Jan. 24, 2011, and claims the benefit of U.S. Provisional Application No. 61/297,430, filed Jan. 22, 2010 and Korean Patent Application No. 10-2011-0006755 filed Jan. 24, 2011, each of which are hereby incorporated by reference for all purposes as if fully set forth herein in their entireties.

TECHNICAL FIELD

The present invention relates to a wireless communication system, and more particularly, to a method and apparatus for providing downlink control information in a multiple-input multiple-output (MIMO) wireless communication system.

BACKGROUND ART

In a mobile communication system, a user equipment (UE) may receive information from a base station in downlink and transmit information to the base station in uplink. Information transmitted or received by a UE includes data and a variety of control information and various physical channels are used according to the type and usage of the information transmitted or received by the UE.

A downlink channel may include a downlink control channel, a downlink data channel, etc. The downlink control channel may include a control signal defining resource allocation and transmission format of a signal transmitted through the downlink data channel. Control information transmitted through the downlink control channel may be referred to as downlink control information (DCI). The downlink control channel may include a variety of DCI formats and the DCI format may include downlink resource allocation information, uplink resource allocation information, etc.

Meanwhile, a multiple-input multiple-output (MIMO) scheme is applicable in uplink or downlink. The MIMO scheme refer to a technology of utilizing two or more transmit/receive antennas in a transmitter and/or a receiver and spatially and simultaneously transmitting several data streams so as to increase system capacity. As the MIMO scheme using several transmission antennas, transmit diversity, spatial multiplexing, beamforming, etc. may be used.

If a MIMO scheme is applied to downlink transmission, in order to accurately perform downlink transmission by a downlink receiver (e.g., a UE), there is a need for DCI for downlink MIMO transmission.

DISCLOSURE

Technical Problem

In the conventional 3GPP LTE system, in downlink transmission, a maximum of two codewords may be supported, transmission through a maximum of four layers (that is, transmission of a maximum of rank 4) may be supported, and only single-layer beamforming transmission may be supported as a beamforming scheme. Introduction of systems for providing better performance than the conventional 3GPP LTE system have been discussed. These systems may support new MIMO schemes such as dual-layer beamforming, transmission of a maximum of rank 8 and UE-specific reference signal (RS) based multi-user MIMO.

In case of downlink transmission using a new MIMO scheme different from the conventional MIMO scheme, a downlink receiver may not accurately receive a downlink signal due to control information according to a previously defined DCI format. Accordingly, there is a need for designing a DCI format for providing control information necessary to accurately transmit and receive a downlink signal in a new downlink MIMO transmission method. Accordingly, an object of the present invention is to provide a method and apparatus capable of providing downlink control information necessary for new downlink MIMO transmission.

The technical problems solved by the present invention are not limited to the above technical problems and other technical problems which are not described herein will become apparent to those skilled in the art from the following description.

Technical Solution

The object of the present invention can be achieved by providing a method of receiving, at a user equipment (UE), a downlink signal from a base station in a wireless communication system supporting downlink multiple-input multiple-output (MIMO) transmission, the method including receiving downlink control information including information indicating the number N ($1 \leq N \leq 8$) of layers, to which one or two enabled codewords of the downlink MIMO transmission are mapped, receiving downlink data transmitted on the N layers and UE-specific reference signals of the N layers based on the downlink control information, and demodulating the downlink data based on the UE-specific reference signals, wherein the information indicating the number of layers further includes information about codes for identifying the UE-specific reference signals.

According to another aspect of the present invention, there is provided a method of transmitting, at a base station, a downlink signal to a user equipment (UE) in a wireless communication system supporting downlink multiple-input multiple-output (MIMO) transmission, the method including transmitting downlink control information including information indicating the number N ($1 \leq N \leq 8$) of layers, to which one or two enabled codewords of the downlink MIMO transmission are mapped, and transmitting downlink data transmitted on the N layers and UE-specific reference signals of the N layers based on the downlink control information, wherein the downlink data is demodulated by the UE based on the UE-specific reference signals, wherein the information indicating the number of layers further includes information about codes for identifying the UE-specific reference signals.

According to another aspect of the present invention, there is provided a user equipment (UE) for receiving a downlink signal from a base station in a wireless communication system supporting downlink multiple-input multiple-output (MIMO) transmission, the UE including a reception module configured to receive downlink control information and downlink data from the base station, a transmission module configured to transmit uplink control information and uplink data to the base station, and a processor configured to control the UE including the reception module and the transmission module, wherein the processor receives the downlink control information including information indicating the number N ($1 \leq N \leq 8$) of layers, to which one or two enabled codewords of the downlink MIMO transmission are mapped, through the reception module, receives downlink data transmitted on the N layers and UE-specific reference signals of the N layers based on the downlink control information through the reception module, and demodulates the downlink data based on the UE-specific reference signals, and wherein the information indicating the number of layers further includes information about codes for identifying the UE-specific reference signals.

According to another aspect of the present invention, there is provided a base station for transmitting a downlink signal to a user equipment (UE) in a wireless communication system supporting downlink multiple-input multiple-output (MIMO) transmission, the base station including a reception module configured to receive uplink control information and uplink data from the UE, a transmission module configured to transmit downlink control information and downlink data to the UE, and a processor configured to control the base station including the reception module and the transmission module, wherein the processor transmits the downlink control information including information indicating the number N (1≤N≤8) of layers, to which one or two enabled codewords of the downlink MIMO transmission are mapped, through the transmission module, and transmits downlink data transmitted on the N layers and UE-specific reference signals of the N layers based on the downlink control information through the transmission module, wherein the downlink data is demodulated by the UE based on the UE-specific reference signals, and wherein the information indicating the number of layers further includes information about codes for identifying the UE-specific reference signals.

In the embodiments of the present invention, the information about the codes for identifying the UE-specific reference signals may be included in the information indicating the number of layers only when one codeword is mapped to one layer and when two codewords are mapped to two layers.

In the embodiments of the present invention, the information about the codes for identifying the UE-specific reference signals may distinguish the UE-specific reference signals transmitted at the same resource element position.

In the embodiments of the present invention, four different UE-specific reference signals transmitted at the same resource element position may be included in one reference signal group, and one reference signal group may be divided into two subgroups by the information about the codes for identifying the UE-specific reference signals, and one subgroup may include two UE-specific reference signals divided by orthogonal codes.

In the embodiments of the present invention, the downlink control information may further include information indicating antenna ports of the downlink MIMO transmission.

In the embodiments of the present invention, the information indicating the number of layers may have 3 bits.

The above general description and the following detailed description of the present invention are exemplary and are intended to additionally describe the claims.

Advantageous Effects

According to the present invention, it is possible to provide a method and apparatus for providing control information of downlink transmission in a wireless communication system to which transmission of a maximum of rank 8, dual-layer beamforming, UE-specific reference signal based multi-user MIMO, etc. is applied.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Figure 1:
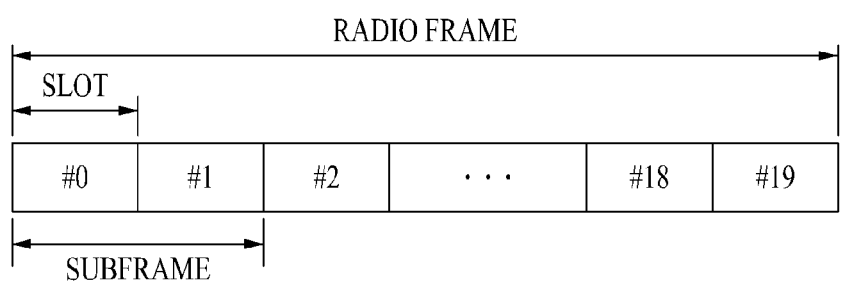
FIG. 1 is a diagram showing the structure of a radio frame used in a $3^{rd}$ Generation Partnership Project Long Term Evolution (3GPP LTE) system.

The following embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a user equipment (UE). In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with the terms fixed station, Node-B, eNode-B (eNB), or access point as necessary. In the present specification, the term "base station" may include a cell or a sector. The term "relay" may be replaced with the terms relay node (RN) or relay station (RS). The term "terminal" may also be replaced with the terms User Equipment (UE), Mobile Station (MS), Mobile Subscriber Station (MSS) or Subscriber Station (SS) as necessary.

In the present invention, a downlink transmitter may be a base station or a relay (if the relay transmits access downlink to a UE) and a downlink receiver may be a UE or a relay (if the relay receives backhaul downlink from a base station). In the following description, although a base station will be representatively described as a downlink transmitter and a UE will be representatively described as a downlink receiver, the present invention is not limited thereto and is applicable to any downlink transmitter and receiver.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following technologies can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied as wireless (or radio) technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of the UMTS (Universal Mobile Telecommunications System). 3GPP (3rd Generation Partnership Project) LTE (long term evolution) is a part of the E-UMTS (Evolved UMTS), which uses E-UTRA. 3GPP LTE employs the OFDMA in downlink and employs the SC-FDMA in uplink. LTE-Advanced (LTE-A) is an evolved version of 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on 3GPP LTE and LTE-A. However, the technical spirit of the present invention is not limited thereto.

FIG. 1 is a diagram showing the structure of a radio frame used in a $3^{rd}$ Generation Partnership Project Long Term Evolution (3GPP LTE) system. One downlink frame includes 10 subframes, and one subframe includes two slots in a time domain. A time required for transmitting one subframe is referred to as a Transmission Time Interval (TTI). For example, one subframe may have a length of 1 ms and one slot may have a length of 0.5 ms. One slot may include a plurality of OFDM symbols in a time domain. In the 3GPP LTE system, since an OFDMA scheme is used in downlink, the OFDM symbol indicates one symbol period. One symbol may be called an SC-FDMA symbol or symbol period in uplink. A resource block (RB) is a resource allocation unit and includes a plurality of contiguous subcarriers in one slot. The structure of the radio frame is only exemplary. Accordingly, the number of subframes included in the radio frame, the number of slots included in the subframe or the number of OFDM symbols included in the slot may be changed in various manners.

Figure 2:
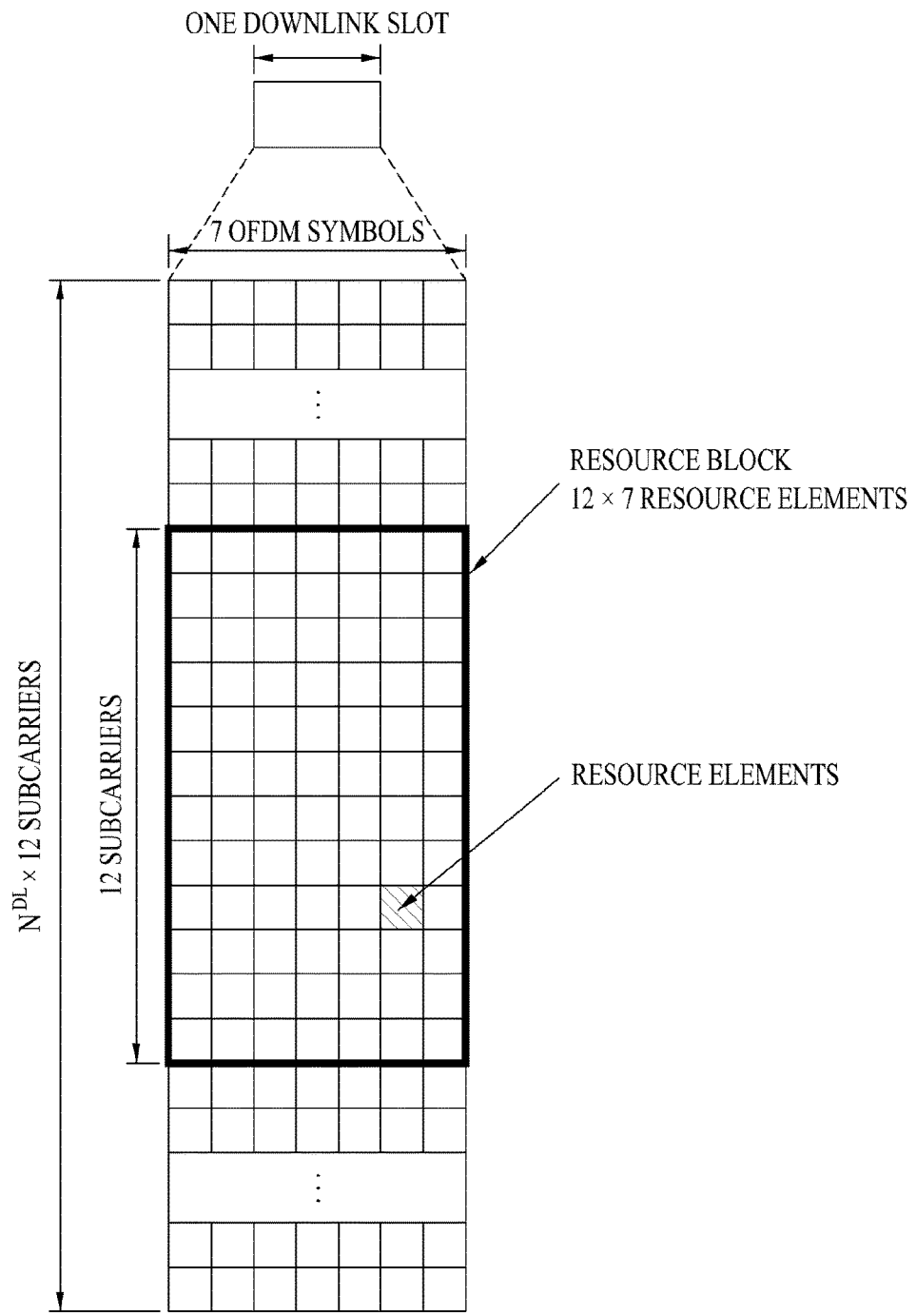
FIG. 2 is a diagram showing a resource grid of a downlink slot.

FIG. 2 is a diagram showing a resource grid of a downlink slot. One downlink slot includes seven OFDM symbols in a time domain and one RB includes 12 subcarriers in a frequency domain, to which the present invention is not limited. For example, one slot includes seven OFDM symbols in a normal cyclic prefix (CP) and one slot includes six OFDM symbols in an extended CP. Each element of the resource grid is referred to as a Resource Element (RE). One RB includes 12×7 REs. The number $N^{DL}$ of RBs included in the downlink slot is determined based on downlink transmission bandwidth. The structure of an uplink slot may be equal to that of the downlink slot.

Figure 3:
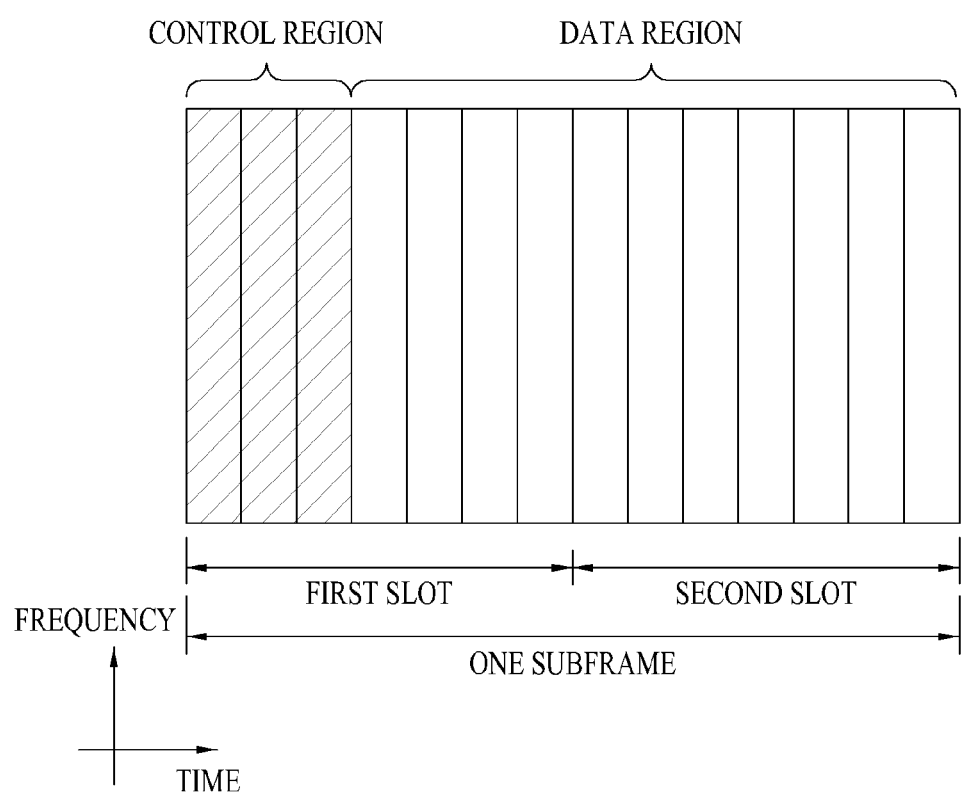
FIG. 3 is a diagram showing the structure of a downlink subframe.

FIG. 3 is a diagram showing the structure of a downlink subframe. A maximum of three OFDM symbols of a front portion of a first slot within one subframe corresponds to a control region to which control channels are allocated. The remaining OFDM symbols correspond to a data region to which Physical Downlink Shared Channels (PDSCHs) are allocated. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response to uplink transmission. The control information transmitted through the PDCCH is referred to as Downlink Control Information (DCI).

The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of a higher layer control message such as a Random Access Response (RAR) transmitted on the PDSCH, a set of transmit power control commands for individual UEs in a certain UE group, transmit power control information, activation of Voice over IP (VoIP), etc. The PDCCH is transmitted on an aggregation of one or several consecutive control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to a DCI to be transmitted to the terminal, and attaches a Cyclic Redundancy Check (CRC) to control information. The CRC is masked with a Radio Network Temporary Identifier (RNTI) according to an owner or usage of the PDCCH. If the PDCCH is for a specific terminal, a cell-RNTI (C-RNTI) of the terminal may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the terminal, a random access-RNTI (RA-RNTI) may be masked to the CRC.

A plurality of PDCCHs may be transmitted within the control region. A UE may monitor the plurality of PDCCHs. Monitoring indicates that a UE attempts to decode PDCCHs according to a DCI format. In a control region allocated within a subframe, a base station does not provide the UE with information about where the PDCCHs are located. The UE monitors a set of PDCCH candidates within the subframe and finds PDCCHs thereof. This is called blind decoding. For example, if the UE does not detect CRC error by demasking a C-RNTI thereof in the PDCCHs, the UE detects a PDCCH having DCI thereof. The UE may be set to receive PDSCH data transmission signaled via a PDCCH according to various transmission modes and such settings may be semi-statically designated via higher layer signaling.

Figure 4:
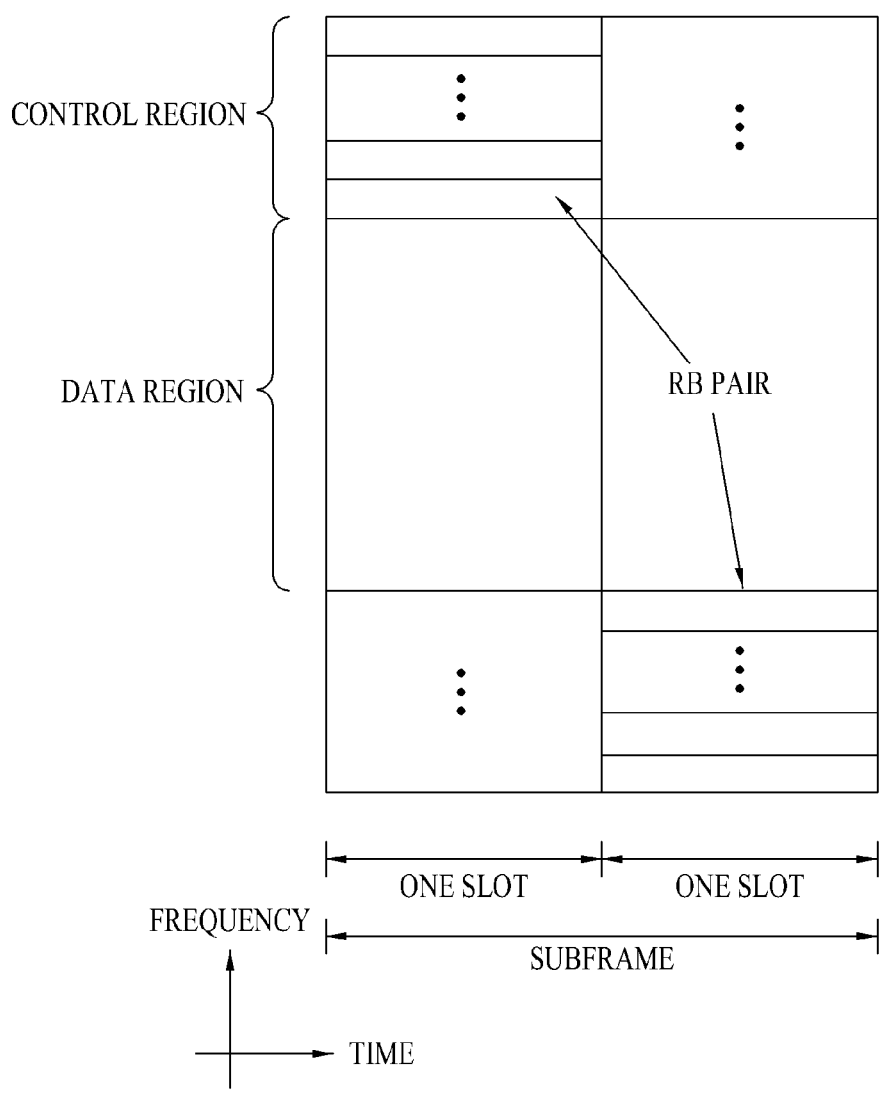
FIG. 4 is a diagram showing the structure of an uplink subframe.

FIG. 4 is a diagram showing the structure of an uplink subframe. The uplink subframe may be divided into a control region and a data region in a frequency domain. A Physical Uplink Control Channel (PUCCH) including uplink control information is allocated to the control region. A Physical uplink Shared Channel (PUSCH) including user data is allocated to the data region. In order to maintain single carrier characteristics, one UE does not simultaneously transmit the PUCCH and the PUSCH. The PUCCH for one UE is allocated to a RB pair in a subframe. RBs belonging to the RB pair occupy different subcarriers with respect to two slots. Thus, the RB pair allocated to the PUCCH is "frequency-hopped" at a slot edge.

The MIMO system uses a technology of collecting data pieces received via several antennas without depending on a single antenna path in order to receive one message. According to the MIMO technology, since data transmission rate is improved in a specific range or a system range can be increased with respect to a specific data transmission rate, the MIMO technology may be widely used for a mobile communication UE and a relay. MIMO may also be multi-antenna technology.

A MIMO channel matrix according to the number of receive antennas and the number of transmit antennas may be divided into a plurality of independent channels. Each independent channel is referred to as a layer or stream. Rank may mean the number of layers or streams. In the following description, in MIMO transmission, "rank" indicates the number of paths which can independently transmit a signal and "the number of layers" indicates the number of signal streams transmitted through each path. In general, since a transmitter transmits layers corresponding in number to the number of ranks used for signal transmission, rank has the same meaning as number of layers unless otherwise stated.

As a MIMO scheme using several transmit antennas, transmit diversity, spatial multiplexing, beamforming, etc. may be used.

The transmit diversity scheme has an advantage that high-reliability data transmission is implemented without receiving feedback information associated with a channel from a receiver by transmitting the same data information through several transmit antennas.

Beamforming is used to increase a signal to interference plus noise ratio (SINR) of a receiver by multiplying several transmit antennas by suitable weights. In general, since an uplink/downlink channel is independent in a frequency division duplexing system and thus high-reliability channel information is necessary in order to obtain suitable beamforming gain, separate feedback may be received from a receiver in order to apply beamforming.

A spatial multiplexing scheme may be divided into a single-user spatial multiplexing scheme and a multi-user spatial multiplexing scheme. The single-user spatial multiplexing scheme is called a spatial multiplexing (SM) scheme or an SU-MIMO scheme, which allocates a plurality of antenna resources of a base station to one user (UE). MIMO channel capacity is increased in proportion to the number of antennas. The multi-user spatial multiplexing scheme is called a spatial division multiple access (SDMA) scheme or an MU-MIMO scheme, which distributes a plurality of antenna resources or wireless spatial resources of a base station to a plurality of users (UEs).

In the case of using the MIMO scheme, there are a single codeword (SCW) scheme for simultaneously transmitting N data streams using one channel encoding block and a multiple codeword (MCS) scheme for transmitting N data streams using M (M being always less than or equal to N) channel encoding blocks. At this time, each channel encoding block generates independent codewords and each codeword may be designed to enable independent error detection.

The conventional MIMO system is designed based on the MCW structure. In the MCW structure, a maximum of two codewords is allowed to be simultaneously transmitted. For MIMO transmission, modulation and coding scheme (MCS) information used by a transmitter, a new data indicator (NDI) indicating whether transmitted data is new data or retransmitted data, and redundancy version (RV) information indicating which subpacket is retransmitted in case of retransmission, etc. are necessary.

Figure 5:
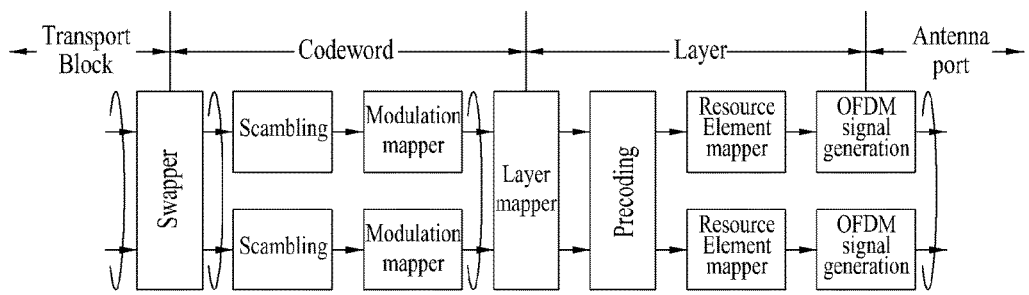
FIG. 5 is a block diagram showing a MIMO transmission structure.

FIG. 5 is a block diagram showing a MIMO transmission structure. In a system supporting a MIMO scheme, a transmitter may transmit one or more codewords. The codewords are mapped to transport blocks from a higher layer, which will be described below. FIG. 5 shows a system supporting a maximum of two codewords. One or more codewords may be processed as complex symbols through a scrambling module and a modulation mapper. Thereafter, the complex symbols are mapped to a plurality of layers by a layer mapper and each layer is multiplied by a predetermined precoding matrix selected according to a channel state by a precoding module to be allocated to each transmit antenna. The signals transmitted through the respective antennas are mapped to time-frequency resource elements to be used for transmission by resource element mappers and are transmitted through OFDM signal generators and antennas.

A transport block-to-codeword mapping relationship will now be described. In FIG. 5, two transport blocks (TBs) are mapped to two codewords according to a transport blockto-codeword mapping rule. If two TBs are enabled, TB-to-codeword mapping may be swapped according to a TB-to-CW swap flag. The TB-to-CW mapping rule may be configured as shown in Tables 1 and 2.

TABLE 1

| TB to CW swap flag value | CW 0 (enabled) | CW 1 (enabled) |
|---|---|---|
| 0 | TB 1 | TB 2 |
| 1 | TB 2 | TB 1 |

TABLE 2

| TB 1 | TB 2 | CW 0 (enabled) | CW 1 (disabled) |
|---|---|---|---|
| enabled | disabled | TB 1 | — |
| disabled | enabled | TB 2 | — |

Table 1 shows an example of a TB-to-CW mapping rule when two TBs are enabled and Table 2 shows an example of a TB-to-CW mapping rule when one TB is enabled and the other is disabled.

Disabling of the TB in Table 2 includes the case in which the size of the TB is 0. If the size of the TB is 0, the TB is not mapped to the CW.

If a signal is transmitted using a single antenna, one codeword is mapped to one layer and is transmitted. However, if a signal is transmitted using multiple antennas, a codeword-to-layer mapping rule is defined as shown in Tables 3 and 4 according to a transmission scheme.

TABLE 3

| Number of layers | Number of code words | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 2 | $x^{(0)}(i) = d^{(0)}(i)$ $x^{(1)}(i) = d^{(1)}(i)$ | $M_{symb}^{layer} = M_{symb}^{(0)} = M_{symb}^{(1)}$ |
| 2 | 1 | $x^{(0)}(i) = d^{(0)}(2i)$ $x^{(1)}(i) = d^{(0)}(2i + 1)$ | $M_{symb}^{layer} = M_{symb}^{(0)}/2$ |
| 3 | 2 | $x^{(0)}(i) = d^{(0)}(i)$ $x^{(1)}(i) = d^{(1)}(2i)$ $x^{(2)}(i) = d^{(1)}(2i + 1)$ | $M_{symb}^{layer} = M_{symb}^{(0)} = M_{symb}^{(1)}/2$ |
| 4 | 2 | $x^{(0)}(i) = d^{(0)}(2i)$ $x^{(1)}(i) = d^{(0)}(2i + 1)$ $x^{(2)}(i) = d^{(1)}(2i)$ $x^{(3)}(i) = d^{(1)}(2i + 1)$ | $M_{symb}^{layer} = M_{symb}^{(0)}/2 = M_{symb}^{(1)}/2$ |

TABLE 4

| Number of layers | Number of code words | Codeword-to-layer mapping $i = 0, 1, \ldots, M_{symb}^{layer} - 1$ | |
|---|---|---|---|
| 2 | 1 | $x^{(0)}(i) = d^{(0)}(2i)$ $x^{(1)}(i) = d^{(0)}(2i + 1)$ | $M_{symb}^{layer} = M_{symb}^{(0)}/2$ |
| 4 | 1 | $x^{(0)}(i) = d^{(0)}(4i)$ $x^{(1)}(i) = d^{(0)}(4i + 1)$ $x^{(2)}(i) = d^{(0)}(4i + 2)$ $x^{(3)}(i) = d^{(0)}(4i + 3)$ | $M_{symb}^{layer} = \begin{cases} M_{symb}^{(0)}/4 & \text{if } M_{symb}^{(0)} \bmod 4 = 0 \\ (M_{symb}^{(0)} + 2)/4 & \text{if } M_{symb}^{(0)} \bmod 4 \neq 0 \end{cases}$ |

If $M_{symb}^{(0)} \bmod 4 \neq 0$ two null symbols shall be appended to $d^{(0)}(M_{symb}^{(0)} - 1)$ Table 3 shows an example in which a signal is transmitted using a spatial multiplexing method and Table 4 shows an example in which a signal is transmitted using a transmit diversity method. In Tables 3 and 4, $x^{(a)}(i)$ indicates an i-th symbol of a layer having an index a and $d^{(a)}(i)$ indicates an i-th symbol of a codeword having an index a. A mapping relationship between the number of codewords and the number of layers used for transmission may be confirmed through the item "number of layers" and the item "number of codewords" of Tables 3 and 4, and the item "codeword-to-layer mapping" indicates how symbols of codewords are respectively mapped to layers.

As can be seen from Tables 3 and 4, although one codeword may be mapped to one layer and transmitted in symbol units, one codeword may be distributed and mapped to a maximum of four layers as in the second case of Table 4.

A mapping relationship between a layer and a physical antennal will be described with reference to FIG. 6. The following description is exemplary and the mapping relationship between the layer and the physical antenna may be arbitrary. In the following description, it is assumed that a system supporting a MIMO scheme has, for example, four physical transmit antennas. If rank is 1, one codeword CW1 may be mapped to one layer and data made by one layer may be encoded using a precoding method so as to be transmitted through four transmit antennas. If rank is 2, two codewords CW1 and CW2 are mapped to two layers and are mapped to four transmit antennas using a precoder. If rank is 3, one codeword CW1 among two codewords is mapped to one layer and the other codeword CW2 is mapped to two layers by a serial-parallel (S/P) converter. That is, a total of two codewords is mapped to three layers and is mapped to four transmit antennas using a precoder. If rank is 4, each of two codewords CW1 and CW2 is mapped to two layers by an S/P converter and a total of four layers is mapped to four transmit antennas using a precoder.

Figure 6:
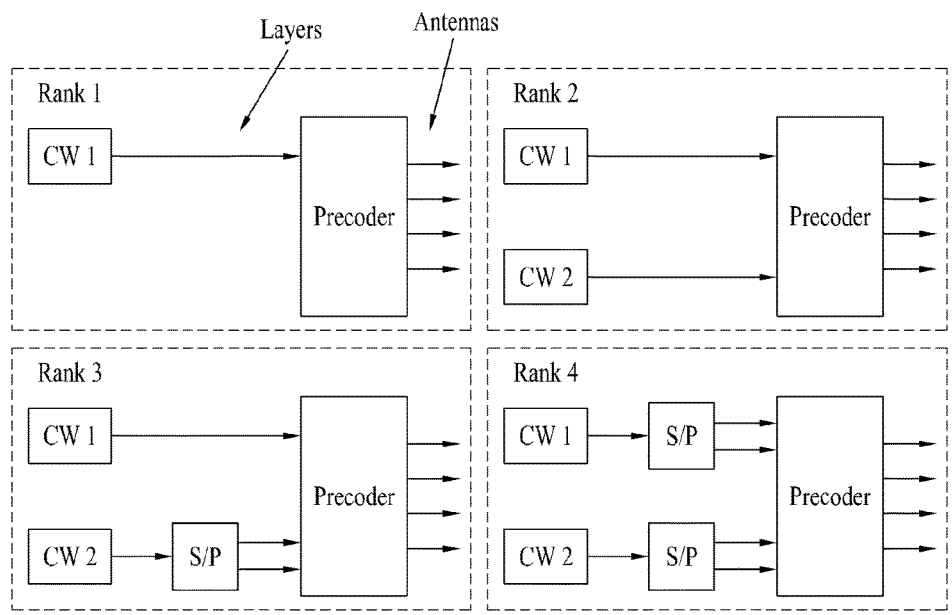
FIG. 6 is a diagram showing a mapping relationship between a layer and a physical antenna in a MIMO transmission structure.

Although a base station having four transmit antennas may have a maximum of four layers and four independent codewords, FIG. 6 shows, for example, a system in which the number of codewords is a maximum of 2. As described above, positions of information transmitted through two codewords CW1 and CW2 may be changed.

Meanwhile, the precoder is generally expressed by Mt (the number of transmit antennas)*v (a spatial multiplexing rate) and a precoding matrix is adaptively used according to circumstance using a set of matrices predetermined by a transmitter/receiver. This set of precoding matrices is referred to as a codebook.

In the conventional 3GPP LTE system, four or more logical antenna ports (e.g., antenna ports 0 to 5) may be used. The antenna ports are not physically distinguished and a determination as to which physical antenna indexes logical antenna indexes are mapped is made by manufacturers. The antenna ports and the physical antennas may not correspond one-to-one to each other and one antenna port may correspond to one physical antenna or an antenna array which is a combination of a plurality of physical antennas.

In the 3GPP LTE system, as a downlink reference signal, three reference signals including a cell-specific reference signal (which is not associated with MBSFN transmission), an MBSFN reference signal and UE-specific reference signal associated with MBSFN transmission may be used.

The cell-specific reference signal uses a sequence generated using a cell ID of each cell as an initial value and antenna ports 0 to 3 may be used to transmit the cell-specific reference signal. The MBSFN reference signal is used to acquire downlink channel information for MBSFN transmission and is transmitted via antenna port 4.

The UE-specific reference signal is supported for single antenna port transmission of a PDSCH and may be transmitted via antenna port 5. A terminal (UE) may receive information as to whether such a UE-specific reference signal from a higher layer (an MAC layer or a higher layer) is used for PDSCH demodulation. The UE-specific reference signal enables beamforming of data transmission to a specific UE. For example, a base station may generate directional transmission to a specific UE using an array (one antenna port) of adjacently located physical antennas. The phases of the signals of different physical antennas are appropriately set and combined at the position of a UE. The UE recognizes such directional transmission as transmission using one antenna. Since beams formed by beamforming experience different channel responses between the base station and the UE, there is a need for use of the UE-specific reference signal in order to enable the UE to accurately demodulate beamformed data.

The above-described UE-specific reference signal corresponds to a dedicated reference signal (DRS) or a precoded demodulation reference signal (DMRS). In case of using a precoded reference signal, reference signals corresponding in number to a spatial multiplexing rate are transmitted.

The UE-specific reference signal may be used for single-layer beamforming (beamforming of transmission of rank 1). As described above, since the UE-specific reference signal is precoded by the same precoder as a precoder applied to data on a PDSCH, a precoding matrix is transparent to the UE. That is, in case of transmission using the UE-specific reference signal, since an estimated channel includes a precoding weight, single-layer beamforming may be implemented without precoding information. Accordingly, a DCI format composed of control signal information which does not include precoding information may be used for single-layer beamforming. For example, for single-layer beamforming, among the above-described DCI formats, DCI format 1 or DCI format 1A defined for single antenna port transmission and transmit diversity may be used.

Since only antenna port 5 is defined as an antenna port for transmitting a UE-specific reference signal in the conventional 3GPP LTE (Release-8) system, if rank is 2 or more, it is necessary to transmit data using the cell-specific reference signal (antenna ports 0 to 3). That is, each UE may perform data demodulation using precoding weight information acquired via a control channel and channel information acquired via a cell-specific reference signal.

Recently, in 3GPP LTE Release-9, introduction of dual-layer beamforming (or dual stream beamforming) has been discussed. Dual-layer beamforming means a MIMO transmission scheme supporting transmission of a maximum of rank 2 based on the UE-specific reference signal (DRS or DMRS) and corresponds to extension of single-layer beamforming. According to dual-layer beamforming, a maximum of two enabled TBs is respectively mapped to two codewords and is transmitted via two layers and a DRS is transmitted per layer. According to dual-layer beamforming, even when the base station does not inform each UE of precoding information, the UE may receive MIMO transmission from the base station without multi-user interference using channel information acquired via the UE-specific reference signal transmitted per layer.

A DRS for dual-layer beamforming may be designed such that layers are orthogonal using a time division multiplexing (TDM)/frequency division multiplexing (FDM)/code division multiplexing (CDM) scheme. If transmission is performed using a single layer only, the UE is informed of a reference signal corresponding to a layer for performing single layer transmission among dedicated reference signals supporting two layers so as to improve data demodulation performance. Accordingly, there is a need for a bit field indicating a reference signal used for single-layer beamforming in downlink control information.

In addition, in dual-layer beamforming, data may be transmitted and received via two layers or a single layer. The case of transmitting different codewords via two layers corresponds to MCW SU-MIMO. In case of transmission using a single layer, SU-MIMO or MU-MIMO may be performed. The case of transmitting data to one user using a single layer corresponds to SU-MIMO. The case of allocating two layers to different users corresponds to MU-MIMO. In case of MU-MIMO, since each UE may separate layers using channel information acquired via the UE-specific reference signal, the base station may provide information indicating a layer corresponding to each UE such that the UE acquires a channel. As described above, in a dual-layer beamforming scheme, since a maximum of two layers is used, 1-bit information is necessary for the base station to indicate one of two layers.

As a control signal for SU-MIMO dual-layer beamforming transmission, DCI format 2A may be used. Meanwhile, a DCI format supporting dual-layer beamforming based MU-MIMO should be determined. In the light of support of SU-MIMO dual-layer beamforming and MU-MIMO dynamic switching, one DCI format for SU-MIMO and MU-MIMO dual-layer beamforming transmission is preferably defined so as to distinguish between SU-MIMO and MU-MIMO within the DCI format.

The operation of the 3GPP LTE Release-9 system may be defined to be included in the operation of the Release-10 system. That is, a dual-layer beamforming transmission operation defined in 3GPP LTE Release-9 needs to be defined to be performed without any problems even in the 3GPP LTE Release-10 system. Overhead of a DRS pattern (that is, the number of downlink resource elements in which a DRS is transmitted) of the 3GPP LTE Release-10 system is changed according to transmission rank. In the 3GPP LTE Release-10 system, for example, a DRS pattern may be designed such that DRS overhead is equally maintained from rank 1 to rank 2, DRS overhead of rank 3 or more is increased as compared to DRS overhead of rank 1 to rank 2, and DRS overhead is the same in rank 3 to rank 8. Alternatively, a DRS pattern may be designed such that DRS overhead is the same from rank 1 to rank 4, DRS overhead of rank 5 or more is increased as compared to DRS overhead of rank 1 to rank 4 and DRS overhead is the same in rank 5 to rank 8. In the 3GPP LTE Release-9 system, dual-layer beamforming is designed to have a maximum of rank 2 and, in the MU-MIMO scheme, one layer is allocated to each UE. At this time, even in the MU-MIMO operation, DRS overhead of rank 2 may be maintained. Meanwhile, in the 3GPP LTE Release-10 system, since transmission of a maximum of rank 8 is supported, 8 or less layers may be allocated to each UE when MU-MIMO transmission is applied. Accordingly, in case of transmission of a maximum of rank 8, the UE should be informed of information about a total transmission rank used for transmission, a transmission rank of each UE and a layer allocated to each UE in order to accurately perform MU-MIMO.

The DRS pattern of the 3GPP LTE Release-9 system may be composed of a subset of a DRS pattern of Release-10 and a transmission mode defined in Release-9 may be defined as one of transmission modes defined in Release-10. In this case, a DCI format only for dual-layer beamforming of Release-9 may be configured. Hereinafter, design of a DCI format simultaneously supporting SU-MIMO and MU-MIMO in a transmission mode of Release-9 will be described.

Bit Field Configuration Method of DCI Format

Hereinafter, an embodiment of the present invention for newly interpreting a field defined in the existing DCI format in order to support dual-layer beamforming will be described. In the existing 3GPP LTE standard (e.g., 3GPP LTE Release-8), DCI formats 0, 1, 1A, 1B, 1C, 1D, 2, 2A, 3 and 3A are defined. Briefly, DCI format 0 is for uplink resource allocation information, DCI formats 1 to 2 are for downlink resource allocation information, and DCI formats 3 and 3A are for an uplink transmit power control (TPC) command for arbitrary UE groups.

DCI format 2A defined in the existing 3GPP LTE standard (Release-8) is shown in Table 5.

TABLE 5

| DCI format 2A | |
|---|---|
| Resource Block Assignment | N bits |
| TPC command for PUCCH | 2 bits |
| Downlink Assignment Index | 2 bits |
| HARQ process number | 3 bits(FDD), 4 bits(TDD) |
| Transport Block to codeword swap flag | 1 bit |
| Transport block 1 MCS | 5 bits |
| New data Indicator | 1 bit |
| Redundancy version | 2 bits |
| Transport block 2 MCS | 5 bits |
| New data Indicator | 1 bit |
| Redundancy version | 2 bits |
| Precoding information | 0 bit (2Tx) 2 bits (4Tx) |

DCI format 2A corresponds to a control information format for 2-codeword open-loop spatial multiplexing transmission. Open-loop spatial multiplexing transmission means that spatial multiplexing transmission is implemented without feedback from a UE. Therefore, non-channel dependent precoding is used in the open loop scheme.

A transmission mode may be semi-statically changed through higher layer signaling. If a transmission mode is defined as dual-layer beamforming, a UE may interpret bit fields of DCI format 2A as having a meaning different from control information for open-loop spatial multiplexing transmission.

DCI format 2A supports a maximum of two codewords (transport blocks) and MCS, NDI and RV are defined with respect to each transport block. As described above, MCS is information about a modulation and coding scheme used by a transmitter, NDI is a new data indicator indicating whether transmitted data is new data or retransmitted data, and RV is redundancy version information indicating which subpacket is retransmitted in case of retransmission.

$2^N$ fields of MCS composed of N bits may be expressed by a modulation order and a transport block size. Some fields are used to indicate an MCS used for data transmission and some fields express only a modulation order, which may be used upon retransmission. In addition, some fields indicate a transport block size of "0", which means that data transmission is not performed. If an MCS field having a transport block size of "0" (zero) is indicated, this means that a transport block is disabled. Alternatively, if an MCS field having a non-zero transport block size is indicated, it means that a transport block is enabled.

A TB-to-CW swap flag indicates whether mapping relationships between two TBs and two CWs may be swapped as described with reference to Table 1.

Precoding information defined in DCI format 2A provides information about transmission rank. Precoding information is set to 0 bits (that is, the precoding information is not present) in case of transmission using 2 antenna ports and is set to 2 bits in case of transmission using 4 antenna ports. The content of the precoding information fields of four antenna ports may be defined as shown in Table 6.

TABLE 6

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 0 | 4 layers: Transmit diversity | 0 | 2 layers: precoder cycling with large delay CDD |
| 1 | 2 layers: precoder cycling with large delay CDD | 1 | 3 layers: precoder cycling with large delay CDD |
| 2 | reserved | 2 | 4 layers: precoder cycling with large delay CDD |
| 3 | reserved | 3 | reserved |

In DCI format 2A, transmit diversity transmission is performed in case of rank 1 (if one codeword is enabled) and spatial multiplexing transmission having two codewords is performed in case of rank 2. The method of applying transmit diversity or spatial multiplexing according to rank may be determined as shown in Tables 7 and 8.

TABLE 7

| 2Tx | Transmit diversity | |
|---|---|---|
| 4Tx | Rank 1 | Transmit diversity |
| | Rank 2 | Spatial Multiplexing |

FIG. 8

| 2Tx | Spatial Multiplexing | |
|---|---|---|
| 4Tx | Rank 2 | Spatial Multiplexing |
| | Rank 3 | Spatial Multiplexing |
| | Rank 4 | Spatial Multiplexing |

Table 7 shows the case in which any one TB is enabled and Table 8 shows the case in which two TBs are both enabled. The TB-to-CW swap flag is not necessary in case of Table 7, but the TB-to-codeword swap flag is necessary in case of Table 8 in order to determine to which CWs two TBs are respectively mapped.

Rank may be explicitly or implicitly indicated. Explicit rank indication may be made using a method of defining a separate rank indicator.

A UE may acquire rank information using an implicit method without setting a rank indicator. Enabling/disabling of TB may be indicated by MCS information and RV of the TB. In DCI format 2A, for example, if an MCS index value of a TB is set to 0 so as to indicate that a transport block size is 0, transmission is not performed and thus the TB is disabled. If the transport block size is not 0, it may be indicated that the TB is enabled. Alternatively, if the MCS index value is set to 0 and RV is set to 1, it may be indicated that the TB is disabled and, otherwise, it may be indicated that the TB is enabled. Accordingly, the UE implicitly confirms that transmission of rank 2 is performed if two TBs are enabled and transmission of rank 1 is performed if one TB is enabled and the other TB is disabled.

According to definition of the existing DCI 2A format, if only one TB is enabled, the TB-to-CW swap flag is reserved and thus the TB-to-CW swap flag is interpreted as having a different meaning.

For example, in case of transmission of rank 1, the TB-to-CW swap flag of DCI format 2A may be used as information indicating an index for a TB, CW or layer used for single-layer beamforming.

Alternatively, the TB-to-CW swap flag may be used as an indicator indicating whether DRS overhead is changed in use of the DRS defined in 3GPP LTE Release-9 and Release-10. For example, in the case in which DRS overhead of 3GPP LTE Release-10 is increased as compared to DRS overhead of Release-9, some resource elements (REs) which are not used for the DRSs in Release-9 should be used for RS transmission. However, if a release-9 UE does not recognize this situation, the release-9 UE interprets that information (e.g., data) other than the RS is transmitted on the REs and may not accurately receive a downlink signal. Accordingly, if the UE is informed that DRS overhead is increased using the TB-to-CW swap flag, the Release-9 UE may recognize that the RE positions where the RS defined in Release-10 are transmitted is null REs and accurately receive a downlink signal.

Alternatively, in case of transmission of rank 1, the TB-to-CW swap flag may be used as a flag indicating whether transmission of rank 1 is single-layer beamforming transmission or transmit diversity transmission.

Hereinafter, various embodiments of the present invention for newly interpreting the bit fields of DCI format 2A will be described in greater detail in addition to the above-described proposals.

Embodiment 1

One embodiment of the present invention for newly interpreting some bit fields of DCI format 2A will now be described.

In the following embodiments, the UE may be informed of whether only one TB is enabled through explicit signaling or implicitly (that is, through an MCS value and/or an RV value of the TB).

In Embodiment 1-1, a TB-to-CW swap flag is used as a codeword indicator.

According to definition of the existing DCI 2A format, if only one TB is enabled, the TB-to-CW swap flag is reserved and a TB 1 and a TB 2 are mapped to a codeword 0 (see Table 2). In the present embodiment, a method of using a TB-to-CW swap flag as an indicator of a codeword, to which one TB is mapped, if only one TB is enabled is proposed. That is, the TB-to-CW swap flag may be reused as information indicating an index of a codeword used for single-layer beamforming.

According to the present embodiment, if only one TB is enabled, the TB-to-CW swap flag is not reserved and is set to a 1-bit value. If only one TB is enabled and a logical value of the swap flag is a first value, a TB 1 is interpreted to be mapped to a codeword 0 when only the TB 1 is enabled and a TB 2 is interpreted to be mapped to a codeword 1 when only the TB 2 is enabled. If only one TB is enabled and a logical value of the swap flag is a second value, a TB 1 is interpreted to be mapped to a codeword 1 when only the TB 1 is enabled and a TB 2 is interpreted to be mapped to a codeword 0 when only the TB 2 is enabled.

The first logical value of the swap flag may correspond to 0 or off and the second logical value of the swap flag may correspond to 1 or on. The first and second logical values may be 1/0 or on/off, but the present invention is not limited thereto. That is, alternatively, the first logical value may correspond to 1 or on and the second logical value may correspond to 0 or off.

The meaning of the first or second logical value is equally applied to other bit fields in the following embodiments of the present invention. That is, a certain bit field having a first or second logical value means that the bit field has a logical value of 1/0 or on/off.

Tables 9 and 10 show the TB-to-CW mapping relationship of Embodiment 1-1.

TABLE 9

| TB to CW mapping swap flag (one TB enabled) = 0 | | | |
|---|---|---|---|
| TB 1 | TB 2 | CW 0 | CW 1 |
| enabled | disabled | TB 1 | — |
| disabled | enabled | — | TB 2 |

TABLE 10

| TB to CW mapping swap flag (one TB enabled) = 1 | | | |
|---|---|---|---|
| TB 1 | TB 2 | CW 0 | CW 1 |
| enabled | disabled | — | TB 1 |
| disabled | enabled | TB 2 | — |

In Embodiment 1-2, a TB-to-CW swap flag is used as a codeword indicator.

According to the present embodiment, if only one TB is enabled, the TB-to-CW swap flag is not reserved and is set to a 1-bit value. If only one TB is enabled and a logical value of the swap flag is a first value (0 or off), the enabled TB is interpreted to be mapped to a codeword 0. If only one TB is enabled and a logical value of the swap flag is a second value (1 or on), the enabled TB is interpreted to be mapped to a codeword 1. Tables 11 and 12 show a TB-to-CW mapping relationship of Embodiment 1-2.

TABLE 11

| TB to CW mapping swap flag (one TB enabled) = 0 ||||
|---|---|---|---|
| TB 1 | TB 2 | CW 0 (enabled) | CW 1 (disabled) |
| enabled | disabled | TB 1 | — |
| disabled | enabled | TB 2 | — |

TABLE 12

| TB to CW mapping swap flag (one TB enabled) = 1 ||||
|---|---|---|---|
| TB 1 | TB 2 | CW 0 (disabled) | CW 1 (enabled) |
| enabled | disabled | — | TB 1 |
| disabled | enabled | — | TB 2 |

In Embodiment 1-3, a TB-to-CW swap flag is used as a layer indicator.

According to the present embodiment, in the case in which only one TB is enabled and the other TB is disabled, the UE may interpret that channel information of a first layer is acquired if the logical value of the swap flag is a first value (0 or off) and interpret that channel information of a second layer is acquired if the logical value of the swap flag is a second value (1 or on).

Although the case in which transmission is performed using a transmit diversity scheme when only one codeword is enabled is described, a 2-layer based transmit diversity scheme may be applied. The UE may acquire information about two channels from a DRS transmitted via each layer. In this case, a codeword-to-layer mapping relationship may follow the mapping relationship of Table 4.

Embodiment 1-4 relates to a method of reusing a new data indicator (NDI) or a redundancy version (RV) field of a disabled TB.

As described above, in DCI format 2A, an MCS field, a NDI field and an RV field are defined with respect to a TB. If one TB is enabled and the other TB is disabled, the NDI field or RV field of the disabled TB may be used for other purposes. A TB may be set to be disabled if the MCS index value of the TB is 0 or if the MCS index value is 0 and the RV value is 1, as described above.

Since a maximum of two layers is used in a dual-layer beamforming scheme, a base station may indicate one layer or antenna port used for single antenna port transmission between two layers using a 1-bit field of DCI information. For example, as shown in Table 13, a layer used for transmission is a first layer if the NDI value of the disabled TB is a first value (or 0) and is a second layer if the NDI value of the disabled TB is a second value (or 1).

TABLE 13

| Indication of antenna port(or layer) for single-antenna port(or layer) transmission (one TB disabled) ||
|---|---|
| New Data Indicator of the disabled TB | Antenna port(or layer) |
| 0 | 1$^{st}$ antenna port(or layer) |
| 1 | 2$^{nd}$ antenna port(or layer) |

Meanwhile, instead of using the NDI field of the disabled TB, a layer may be indicated using an RV field. If the TB is disabled when the MCS index value of the TB is 1, a first layer may be indicated if the RV field of the disabled TB is a first value (or 0) and a second layer may be indicated if the RV field is a second value (or 1).

In Embodiment 1-4-1, a layer number (or an index) to which an enabled TB is mapped may be indicated through the NDI or RV field of the disabled TB. As described with reference to Table 5, the NDI field of DCI format 2A has a size of 1 bit and the RV field has a size of 2 bits. Accordingly, a layer used for transmission may be indicated using all or some of a total of 3 bits for the NDI and RV associated with the disabled TB.

For example, in a transmission scheme supporting a maximum of two ranks, two layers are used. In this case, it indicates whether a layer used for transmission is a first layer or a second layer using 1 bit among bits for the NDI or RV. For example, in a transmission scheme supporting a maximum of four ranks, four layers are used. In this case, it may indicate which of first to fourth layers is used for transmission using 2 bits among bits for the NDI or RV. For example, in a transmission scheme supporting a maximum of eight ranks, eight layers are used. In this case, it may indicate which of first to fourth layers is used for transmission using 3 bits among bits for the NDI or RV.

In Embodiment 1-4-2, a layer group number (or an index) to which an enabled TB is mapped may be indicated through the NDI or RV field of the disabled TB. For example, layers used for transmission are divided into N groups and it may indicate which of the N layer groups is used for transmission using M bits among a total of 3 bits for the NDI and RV.

For example, if four layers are divided into two groups, a layer group index may be indicated using 1 bit. For example, if eight layers are divided into four groups, a layer group index may be indicated using 2 bits. For example, if eight layers are divided into two groups, a layer group index may be indicated using 1 bit.

In Embodiment 1-4-3, information indicating whether RS overhead is changed may be indicated through the NDI or RV field of a disabled TB. As described above, DRS overhead may be changed according to a total transmission rank and a DRS according to rank may be defined in 3GPP LTE Release-10, but may not be defined in Release-9. Accordingly, when a Release-9 UE operates in the Release-10 system, an RS may be transmitted in a state of exceeding RS overhead which may be recognized by the Release-9 UE. In this case, if an RS is transmitted in an RE region in which data is recognized as being transmitted by a Release-9 user, a problem may occur upon receipt of data from the viewpoint of the Release-9 UE. Accordingly, it is necessary to inform the Release-9 UE as to whether there is an RE in which data is not transmitted.

Information about whether RS overhead is changed may be indicated using 1 bit among bits for the NDI and/or RV of the disabled TB. If an RS overhead change flag has a first value (e.g., on), the Release-9 UE may operate so as not to read data in an RE corresponding to a position where an RS is transmitted in the Release-10 system. In addition, when an effective coding rate is calculated, the number of subcarriers may be calculated in consideration of increased RS overhead. The effective coding rate may be calculated according to a burst size/(the number of subcarriers×a modulation order).

In Embodiment 1-4-4, an NDI or RV field of a disabled TB may be used as an indicator indicating whether transmit diversity transmission is performed.

As described above, if two antenna ports are used, a precoding information field of DCI format 2A is not defined. According to the existing DCI format 2A, a precoding information field is not defined with respect to 2 transmit antenna ports, but is defined such that an operation is performed according to a transmit diversity scheme if one codeword is enabled (that is, in case of rank 1). If DCI format 2A is used for dual-layer beamforming, transmission of rank 1 is not clearly indicated. That is, it is not indicated whether transmission of rank 1 is transmit diversity transmission or beamforming of rank 1.

More specifically, if a precoding information field is not defined, a determination as to whether a rank-1 beamforming scheme or a rank-2 beamforming scheme is used may be made depending on whether two codewords are enabled. Even in a dual-layer beamforming scheme, transmit diversity needs to be defined using a basic transmission scheme. However, since the transmit diversity scheme corresponds to transmission of rank 1, it is difficult to indicate whether a rank-1 beamforming scheme or a transmit diversity scheme is used only depending on whether one codeword is disabled. Accordingly, if one codeword is disabled, it is necessary to indicate whether a rank-1 beamforming scheme or a transmit diversity scheme is used.

It is possible to define whether a transmit diversity scheme is used using the NDI or RV field of the disabled TB. For example, the transmit diversity scheme is used if the NDI value of the disabled TB is a first value and the rank-1 beamforming scheme is used if the NDI value is a second value. In case of the transmit diversity scheme, the UE may perform data demodulation using a cell-specific RS (CRS) or using a DRS for 2-layer transmission.

Embodiment 1-5 relates to a method of supporting an operation for enabling a Release-9 UE to recognize the position of an RE in which an RS defined in 3GPP LTE Release-10 is transmitted as a null RE. For this method, a TB-to-CW swap flag may be used as an indicator indicating whether a null RE is present for DRS transmission defined in Release-10.

For example, if the TB-to-CW swap flag is a first value (e.g., 0), it may indicate that a Release-9 DRS pattern is used. In this case, if a TB 1 is enabled and a TB 2 is disabled, transmission is performed via a layer 0 and, if the TB 1 is disabled and the TB 2 is enabled, transmission is performed via a layer 1.

For example, if the TB-to-CW swap flag is a second value (e.g., 1), it may indicate that a null RE is present while using a Release-9 DRS pattern. In this case, if a TB 1 is enabled and a TB 2 is disabled, transmission is performed via a layer 0 and, if the TB 1 is disabled and the TB 2 is enabled, transmission is performed via a layer 1.

In Embodiment 1-5, a TB-to-CW mapping relationship may be set as shown in Table 2.

In Embodiment 1-6, a TB-to-CW mapping swap flag field is used as an indicator indicating a transmission scheme.

In the present embodiment, if only one TB is enabled, one of a transmit diversity scheme or a single-layer beamforming scheme may be indicated according to the value of the TB-to-CW swap flag. For example, if the TB-to-CW swap flag value is a first value (e.g., 0), it indicates that the transmit diversity scheme is used. If the TB-to-CW swap flag value is a second value (e.g., 1), it indicates that the single-layer beamforming scheme is used. In this case, if a TB 1 is enabled and a TB 2 is disabled, transmission is performed via a layer 0 and, if the TB 1 is disabled and the TB 2 is enabled, transmission is performed via a layer 1.

In Embodiment 1-7, a precoding information field defined in DCI format 2A is newly interpreted for dual-layer beamforming.

In DCI format 2A defined for open-loop spatial multiplexing, the precoding information field is set to 0 bits in case of 2-antenna port transmission and is set to 2 bits in case of 4-antenna port transmission. Since a dual-layer beamforming transmission mode uses a maximum of 2 antenna ports, the precoding information field is not necessary as described above and the "precoding information" field may be set to 0 bits or may be defined so as not to be interpreted even when bits are allocated to the precoding information field in a dual-layer beamforming transmission mode.

As shown in Table 6, in the existing DCI format 2A, a reserved bit field (e.g., bit fields 2 and 3 if one codeword is enabled and a bit field 3 if two codewords are enabled) is present in the precoding information field for four antenna ports. The reserved bit field may be defined for dual-layer beamforming.

According to DCI format 2A, as described above, if only one codeword is enabled, it may be interpreted that a single-layer precoding scheme or a transmit diversity scheme is used. Accordingly, if dual-layer beamforming is applied, there is a need for downlink control information, in order to indicate which scheme is used. Hereinafter, various methods of the present invention for defining some reserved fields of the precoding information field for four antenna ports for dual-layer beamforming will be described.

As shown in Table 14, if only one codeword is enabled, "single layer precoding" may be explicitly indicated via a predetermined bit value of the precoding information field for four antenna ports.

TABLE 14

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 0 | 4 layers: Transmit diversity | 0 | 2 layers: precoder cycling with large delay CDD |
| 1 | 2 layers: precoder cycling with large delay CDD | 1 | 3 layers: precoder cycling with large delay CDD |
| 2 | Single layer precoding | 2 | 4 layers: precoder cycling with large delay CDD |
| 3 | reserved | 3 | reserved |

Alternatively, as shown in Table 15, the precoding information field for four antenna ports may indicate whether RS overhead is changed. More specifically, if a Release-9 UE operates in the 3GPP LTE Release-10 system, as described above, RS overhead may be changed. In this case, since the Release-9 UE cannot know an RS position which is additionally defined with respect to a Release-10 UE, serious performance deterioration may occur in downlink data demodulation of the Release-9 UE. Accordingly, it is necessary to inform the Release-9 UE of information indicating that RS overhead is increased and information indicating that RS overhead is increased rank-1 precoding and rank-2 precoding using a predetermined bit value of the precoding information field for four antenna ports of DCI format 2A.

TABLE 15

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 0 | 4 layers: Transmit diversity | 0 | 2 layers: precoder cycling with large delay CDD |
| 1 | 2 layers: precoder cycling with large delay CDD | 1 | 3 layers: precoder cycling with large delay CDD |
| 2 | Single layer precoding | 2 | 4 layers: precoder cycling with large delay CDD |
| 3 | Single layer precoding (RS overhead increase) | 3 | 2 layers: Precoding without CDD (RS overhead increase) |

Alternatively, as shown in Table 16, the precoding information field for four antenna ports may indicate single layer precoding and indicate which of first and second layers (layer 0 or layer 1) corresponds to single layer precoding.

TABLE 16

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 0 | Transmit Diversity | 0 | 2 layers: precoding without CDD |
| 1 | Single layer precoding (layer 0) | 1 | — |
| 2 | Single layer precoding (layer 1) | 2 | — |
| 3 | — | 3 | — |

In Table 16, a bit field 0 of the precoding information field indicates transmit diversity if only one codeword is enabled. In this case, the UE may perform data demodulation using a CRS or a DRS for two-layer transmission.

Alternatively, as shown in Table 17, the precoding information field for four antenna ports may indicate whether RS overhead is changed and which of first and second layers (layer 0 or layer 1) corresponds to single layer precoding.

TABLE 17

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 0 | Single layer precoding (layer 0) | 0 | 2 layers: precoding without CDD |
| 1 | Single layer precoding (layer 1) | 1 | 2 layers: precoding without CDD (RS overhead increase) |
| 2 | Single layer precoding (layer 0) (RS overhead increase) | 2 | — |
| 3 | Single layer precoding (layer 1) (RS overhead increase) | 3 | — |

In Table 17, if only one codeword is enabled and the transmit diversity scheme is used, the UE may perform data demodulation using a CRS or a DRS for two-layer transmission.

According to the above-described embodiment of the present invention, a DCI format which can simultaneously support SU-MIMO and MU-MIMO in dual-layer beamforming is provided. That is, DCI formats used for dual-layer beamforming and single-layer beamforming may have the same bit field size and switching therebetween may be dynamically performed by transmitting a PDCCH including corrected DCI format 2A proposed by the present invention.

Embodiment 2

Next, another embodiment of the present invention for newly interpreting bit fields of DCI format 1A or DCI format 1D for dual-layer beamforming will be described.

Table 18 shows DCI formats 1 and 1A defined in the conventional 3GPP LTE standard (e.g., 3GPP LTE Release-8). DCI format 1/1A includes control information used for transmission of rank 1, such as a single antenna, a single stream, transmit diversity transmission.

TABLE 18

| DCI format 1 | |
|---|---|
| Resource Allocation Header | 1 bit |
| Resource block assignment | N bits |
| Modulation and coding scheme | 5 bits |
| HARQ process number | 3 bits (FDD), 4 bits(TDD) |
| New data Indicator | 1 bit |
| Redundancy version | 2 bits |
| TPC command for PUCCH | 2 bits |
| Downlink Assignment Index | 2 bits |
| DCI format 1A | |
| Flag for format 0/1A differentiation | 1 bit |
| Localized/Distributed VRB assignment Flag | 1 bit |
| Resource block assignment | N bits |
| Modulation and coding scheme | 5 bits |
| HARQ process number | 3 bits (FDD1, 4 bits(TDD) |
| New data Indicator | 1 bit |
| Redundancy version | 2 bits |
| TPC command for PUCCH | 2 bits |
| Downlink Assignment Index | 2 bits |

DCI format 1A is defined for compact scheduling one PDSCH codeword in various transmission modes and may be used for the transmit diversity scheme. In the present invention, methods for newly interpreting DCI format 1A for dual-layer beamforming are proposed. If dual-layer beamforming is defined as a transmission mode (a transmission mode is semi-statically set through higher layer signaling as described above), the UE may interpret some bit fields as having a different meaning from the transmit diversity scheme in interpretation of DCI format 1A.

Among fields defined in DCI format 1A, a "flag for format 0/format 1A differentiation" is set to 1 bit, the value 0 of the "flag for format 0/format 1A differentiation" indicates format 0 and the value 1 of the "flag for format 0/format 1A differentiation" indicates format 1A. Format 1A is used for a random access procedure initiated by a PDCCH order only when format 1A CRC is scrambled with a C-RNTI.

In addition, among fields defined in DCI format 1A, a "localized/distributed VRB assignment flag" is set to 1 bit, and is set to 0 if the "flag for format 0/format 1A differentiation" is set to 1 (that is, in case of format 1A). Otherwise (that is, in case of format 0), the value 0 of the "localized/distributed VRB assignment flag" indicates localized VRB assignment and the value 1 of the "localized/distributed VRB assignment flag" indicates distributed VRB assignment.

In Embodiment 2-1 of the present invention, the "flag for format 0/format 1A differentiation" is newly interpreted for dual-layer beamforming. For example, if the logical value of the "flag for format 0/format 1A differentiation" is a first value, a transmit diversity scheme is used and, if the logical value of the "flag for format 0/format 1A differentiation" is a second value, the single-layer beamforming scheme is used. As described above, the first value of the logical value of a certain bit field indicates 0 or off and the second value indicates 1 or on, and vice versa.

Alternatively, if the logical value of the "flag for format 0/format 1A differentiation" is a first value, a first layer (layer 0) may be indicated in a DRS pattern and, if the logical value of the "flag for format 0/format 1A differentiation" is a second value, a second layer (layer 1) may be indicated in a DRS pattern.

Alternatively, if the logical value of the "flag for format 0/format 1A differentiation" is a first value, a Release-9 DRS pattern is used and, if the logical value of the "flag for format 0/format 1A differentiation" is a second value, null is applied to an RE in which a DRS is additionally transmitted in Release-10 while using a Release-9 DRS pattern.

In Embodiment 2-2, the "localized/distributed VRB assignment flag" is newly interpreted for dual-layer beamforming.

For example, if the logical value of the "localized/distributed VRB assignment flag" is a first value, the transmit diversity scheme is used and, if "localized/distributed VRB assignment flag" is a second value, the single-layer beamforming scheme is used.

Alternatively, if the logical value of the "localized/distributed VRB assignment flag" is a first value, a first layer (layer 0) may be indicated in a DRS pattern and, if "localized/distributed VRB assignment flag" is a second value, a second layer (layer 1) may be indicated in a DRS pattern.

Alternatively, if the logical value of the "localized/distributed VRB assignment flag" is a first value, a Release-9 DRS pattern is used and, if "localized/distributed VRB assignment flag" is a second value, null is applied to an RE in which a DRS is additionally transmitted in Release-10 while using a Release-9 DRS pattern.

In Embodiment 2-3, 2 bits for the "flag for format 0/format 1A differentiation" and the "localized/distributed VRB assignment flag" are newly interpreted for dual-layer beamforming.

For example, 1 bit of 2 bits for the "flag for format 0/format 1A differentiation" and the "localized/distributed VRB assignment flag" may indicate transmit diversity or single-layer beamforming. If single-layer beamforming is indicated, the remaining 1 bit may include one of a first layer or a second layer in a DRS pattern.

For example, 1 bit of 2 bits for the "flag for format 0/format 1A differentiation" and the "localized/distributed VRB assignment flag" may indicate transmit diversity or single-layer beamforming. If single-layer beamforming is indicated, the remaining 1 bit may indicate whether null is applied to an RE in which a DRS is additionally transmitted in Release-10.

For example, 1 bit of 2 bits for the "flag for format 0/format 1A differentiation" and the "localized/distributed VRB assignment flag" may indicate a first layer (layer 0) in a DRS pattern and, if a logical value is a second layer, a second layer (layer 1) may be indicated. At this time, the remaining 1 bit may indicate whether null is applied to an RE in which a DRS is additionally transmitted in Release-10.

Table 19 shows DCI format 1D defined in the existing 3GPP LTE standard (Release-8).

TABLE 19

| Localized/Distributed VRB assignment Flag | 1 bit |
|---|---|
| Resource Block Assignment | N-bits |
| MCS | 5 bits |
| HARQ | 3 bits(FDD), 4 bits(TDD) |
| NDI | 1 bit |
| RV | 2 bits |
| TPC command for PUCCH | 2 bits |
| DL Assignment Index | 0 bit(FDD), 2 bits(TDD) |
| TPMI Information for precoding | 2 bits(2Tx), 4 bits(4Tx) |

DCI format 1D is defined for compact scheduling of one PDSCH codeword having precoding and power offset information and may be used for MU-MIMO transmission. In the present invention, methods for newly interpreting DCI format 1D for dual-layer beamforming are proposed. If dual-layer beamforming is defined as a transmission mode, the UE may interpret some bit fields of DCI format 1D as having a different meaning from MU-MIMO.

Among the fields defined in DCI format 1D, a "TPMI information for precoding" field indicates a codebook index used for transmission, has 2 bits if the number of antenna ports of a base station is 2, and has 4 bits if the number of antenna ports of the base station is 4.

According to Embodiment 2-4 of the present invention, a "TPMI information for precoding" field of DCI format 1D may be newly interpreted for dual-layer beamforming.

For example, the transmit diversity scheme or the single-layer beamforming scheme may be indicated using 1 bit of the "TPMI information for precoding" field. If the logical value of 1 bit of the "TPMI information for precoding" field with 2 bits or 4 bits is a first value, the transmit diversity scheme is indicated and, if the logical value of 1 bit of the "TPMI information for precoding" field with 2 bits or 4 bits is a second value, the single-layer beamforming scheme is indicated.

Alternatively, using 1 bit of the "TPMI information for precoding" field, a first layer (layer 0) may be indicated in a DRS pattern if the logical value of the 1 bit is a first value and a second layer (layer 1) may be indicated in a DRS pattern if the logical value of the 1 bit is a second value.

Alternatively, using 1 bit of the "TPMI information for precoding" field, it may be indicated whether null is applied to an RE in which a DRS is additionally transmitted in Release-10.

Alternatively, between 2 bits of the "TPMI information for precoding" field, 1 bit may indicate the transmit diversity scheme or the single-layer beamforming scheme and the remaining 1 bit may indicate a first layer or a second layer in a DRS pattern.

Alternatively, between 2 bits of the "TPMI information for precoding" field, 1 bit may indicate the transmit diversity scheme or the single-layer beamforming scheme and the remaining 1 bit may indicate whether null is applied to an RE in which a DRS is additionally transmitted in Release-10.

Alternatively, between 2 bits of the "TPMI information for precoding" field, 1 bit may indicate a first layer or a second layer in a DRS pattern and the remaining 1 bit may indicate whether null is applied to an RE in which a DRS is additionally transmitted in Release-10.

Embodiment 3

Hereinafter, other embodiments of the present invention for defining a new DCI format for dual-layer beamforming will be described.

In dual-layer beamforming transmission, two enabled TBs may be mapped to two CWs and transmitted via two layers. In addition, the UE may perform data demodulation using channel information acquired through a reference signal transmitted per layer. In order to transmit two TBs, an MCS, an NDI and an RV are defined with respect to each TB. In addition, a TB-to-CW swap flag for changing a mapping relationship between two TBs and two CWs is defined and robust data transmission may be achieved through swapping of the TB-to-CW mapping relationship.

A DRS for dual-layer beamforming may be designed such that layers are orthogonal through a TDM/FDM/CDM scheme. If transmission is performed using only a single layer, the UE is informed of a reference signal corresponding to a layer for performing single layer transmission among reference signals supporting two layers so as to improve data demodulation performance. Accordingly, there is a need for a bit field indicating a reference signal used for single-layer beamforming in downlink control information.

When a new (or corrected) DCI format for dual-layer beamforming is designed based on DCI format 2A, the following matters may be considered.

As described above, dual-layer beamforming has a maximum of rank 2. Since rank is equal to the number of TBs used for transmission, a separate indicator for a TB is not necessary. In addition, the UE may confirm that the TB is disabled if the value of the MCS index of one TB is set to 0 (or the value of the MCS index is set to 0 and the RV value is set to 1). The UE may implicitly recognize that rank is set to 1 if one TB is disabled and rank is set to 2 if two TBs are enabled. In addition, if a DRS (a precoded UE-specific reference signal) is used per layer, since a weight matrix used for precoding does not need to be indicated, it is not necessary to define a precoding information in a DCI format in case of dual-layer beamforming using a DRS.

In addition, if a dual-layer beamforming transmission mode is used (the transmission mode is semi-statically set through higher layer signaling), a DRS for dual-layer beamforming is used and the UE may receive data using two layers or a single layer. If dual layers are used, an SU-MIMO operation may be performed and, if a single layer is used, an SU-MIMO or MU-MIMO operation may be performed. The same DCI format may be used so as not to distinguish between SU-MIMO and MU-MIMO in dual-layer beamforming. That is, in dual-layer beamforming and single-layer beamforming, control information is transmitted by a DCI having the same bit field size and some bit fields used for dual-layer beamforming may be interpreted as an indicator for single-layer beamforming.

In addition, if a dual-layer beamforming transmission mode is used, a compact DCI format may be defined for a UE which receives only a single layer.

An example of a new DCI format satisfying the above-described considerations will be described with reference to Table 20. The DCI format shown in Table 20 includes the same fields as DCI 2A and, hereinafter, a difference between the new DCI format and the existing DCI 2A format will be focused upon.

TABLE 20

| | | Single-layer Beam | Dual-layer Beam |
|---|---|---|---|
| Resource Block Assignment | | N bits | N bits |
| TPC command for PUCCH | | 2 bits | 2 bits |
| Downlink Assignment Index | | 2 bits | 2 bits |
| HARQ process number | | 3 bits(FDD), 4 bits(TDD) | 3 bits(FDD), 4 bits(TDD) |
| Layer Indicator (One codeword case) | | 1 bit | 1 bit |
| Transport Block to codeword swap flag (Two codeword case) | | | |
| Transport block 1 | MCS | 5 bits | 5 bits |
| | New data Indicator | 1 bit | 1 bit |
| | Redundancy version | 2 bits | 2 bits |
| Transport block 2 | MCS | 5 bits | 5 bits |
| | New data Indicator | 1 bit | 1 bit |
| | Redundancy version | 2 bits | 2 bits |
| Precoding information | | 0 bit | 0 bit |

The DCI format of Table 20 is to provide control information of single-layer beamforming and dual-layer beamforming. In the single-layer beamforming mode and the dual-layer beamforming mode, resource block assignment, TPC command for PUCCH, downlink assignment index, HARQ process number, MCS index, new data indicator and redundancy version for transport blocks 1 and 2, and precoding information may be defined. These fields substantially have the same meaning as that defined in the existing DCI format 2A. Among others, the precoding information field is set to 0 bits as described above.

Unlike the existing DCI format 2A, in the DCI format of Table 20, a TB-to-CW swap flag is used for dual-layer beamforming. In case of single-layer beamforming transmission, the TB-to-CW swap flag may be interpreted as a "layer indicator".

If two TBs are enabled, the TB-to-CW swap flag may be used as information indicating a TB-to-CW mapping relationship and the mapping relationship may be defined as shown in Table 1.

If one TB is enabled and the other TB is disabled, the enabled TB may be mapped to a codeword 0 as shown in Table 2. In case of single-layer beamforming in which only one codeword is enabled, the TB-to-CW swap flag is interpreted as a "layer indicator". If the logical value of the layer indicator is a first value (0 or off), a first layer (layer X) is indicated, and, if the logical value of the layer indicator is a second value (1 or on), a second layer (layer Y) is indicated. Alternatively, in the logical value of the layer indicator, a first value may indicate 1 or on and a second value may indicate 0 or off. The logical value of the layer indicator may indicate correspondence between first and second layers. The layer indicator may be interpreted as shown in Table 21.

TABLE 21

| Transport block to codeword swap flag value (Layer Indication flag value) | Codeword 0 (enabled) | Codeword 1 (disabled) |
|---|---|---|
| 0 | Layer X/Antenna port X | |
| 1 | Layer Y/Antenna port Y | |

The "layer indicator" may be referred to as an "antenna port indicator" or a "reference signal (RS) position" and may be interpreted to indicate a layer (or an antenna port) in which an RS is located or a layer/antenna port corresponding to an enabled codeword. The UE may confirm, to which layer channel information valid with respect to the UE belongs, through information acquired from the layer indicator.

According to the new DCI format defined in Table 20, the DCI formats for dual-layer beamforming and single-layer beamforming are set to have the same size, and dynamic mode adaptation of SU-MIMO and MU-MIMO and dynamic rank adaptation of rank 1 and rank 2 may be implemented.

Next, other embodiments of a new DCI format satisfying the above-described considerations will be described with reference to Table 22. A description of common parts of the DCI formats shown in Tables 20 and 22 will be omitted for simplicity.

TABLE 22

| | | Single-layer Beam | Dual-layer Beam |
|---|---|---|---|
| Resource Block Assignment | | N bits | N bits |
| TPC command for PUCCH | | 2 bits | 2 bits |
| Downlink Assignment Index | | 2 bits | 2 bits |
| HARQ process number | | 3 bits(FDD), 4 bits(TDD) | 3 bits(FDD), 4 bits(TDD) |
| Transport Block to codeword swap flag (Two codeword case) | | 1 bit | 1 bit |
| Transport block 1 | MCS | 5 bits | 5 bits |
| | New data Indicator (Transport block 1 enabled) Layer Indicator (Transport block 1 disabled) | 1 bit | 1 bit |
| | Redundancy version | 2 bits | 2 bits |
| Transport block 2 | MCS | 5 bits | 5 bits |
| | New data Indicator (Transport block 2 enabled) Layer Indicator (Transport block 2 disabled) | 1 bit | 1 bit |
| | Redundancy version | 2 bits | 2 bits |
| Precoding information | | 0 bit | 0 bit |

In the DCI format of Table 22, a TB-to-CW swap flag is defined, similarly to the existing DCI format 2A. That is, the TB-to-CW swap flag is used for dual-layer beamforming, may be used as information indicating a TB-to-CW mapping relationship if two codewords are enabled, and the mapping relationship may be defined as shown in Table 1. If one TB is enabled and the other TB is disabled, the enabled TB may be mapped to a codeword 0 as shown in Table 2.

In the DCI format of Table 22, if the MCS index value of one TB is set to 0 (or the MCS index value is set to 0 and the RV value is set to 1), the TB is enabled and the other TB is disabled, the UE may implicitly recognize single-layer beamforming transmission.

An NDI field of a disabled TB may be interpreted as a layer indicator of an enabled TB. For example, if a TB 1 is enabled and a TB 2 is disabled, the NDI of TB 1 indicates whether data transmitted via the enabled TB 1 is new data or retransmitted data and the NDI field of the TB 2 may be interpreted as a layer indicator (or an antenna port indicator/RS position) for the TB 1. For example, if the logical value of the NDI of the enabled TB is a first value (0 or off), a first layer (layer X) or a first antenna port (antenna port X) is indicated and, if the logical value of the NDI of the enabled TB is a second value (1 or on), a second layer (layer Y) or a second antenna port (antenna port Y) is indicated. Alternatively, the first value of the logical value of the NDI field may indicate 1 or on, the second value may indicate 0 or off, and the logical value of the NDI field may indicate correspondence between first and second layers. The UE may confirm, to which layer channel information valid with respect to the UE belongs, through information acquired from the layer indicator. The layer indicator may be interpreted as shown in Table 23.

TABLE 23

| New data indicator of disabled transport block | Codeword 0 (enabled) | Codeword 1 (disabled) |
|---|---|---|
| 0 | Layer X/Antenna port X | |
| 1 | Layer Y/Antenna port Y | |

According to the new DCI format defined in Table 22, the DCI formats for dual-layer beamforming and single-layer beamforming are set to have the same size, and dynamic mode adaptation of SU-MIMO and MU-MIMO and dynamic rank adaptation of rank 1 and rank 2 may be implemented.

Next, other embodiments of a new DCI format satisfying the above-described considerations will be described with reference to Table 24. A description of common parts of the DCI formats shown in Tables 20 and 24 will be omitted for simplicity.

TABLE 24

| | | Single-layer Beam | Dual-layer Beam |
|---|---|---|---|
| Resource Block Assignment | | N bits | N bits |
| TPC command for PUCCH | | 2 bits | 2 bits |
| Downlink Assignment Index | | 2 bits | 2 bits |
| HARQ process number | | 3 bits(FDD), 4 bits(TDD) | 3 bits(FDD), 4 bits(TDD) |
| ~~Transport Block to codeword swap flag (Two codeword case)~~ | | ~~1 bit~~ | 1 bit |
| Transport block 1 | MCS | 5 bits | 5 bits |
| | New data Indicator (Transport block 1 enabled) Layer Indicator (Transport block 1 disabled) | 1 bit | 1 bit |
| | Redundancy version | 2 bits | 2 bits |
| Transport block 2 | MCS | 5 bits | 5 bits |
| | New data Indicator (Transport block 2 enabled) Layer Indicator (Transport block 2 disabled) | 1 bit | 1 bit |
| | Redundancy version | 2 bits | 2 bits |
| Precoding information | | 1/2/3 bit | 1/2/3 bit |

In the DCI format of Table 24, a TB-to-CW swap flag is not defined, unlike the existing DCI format 2A. Thus, if two codewords are enabled, a codeword 0 maybe mapped to a TB 1 and a codeword 1 may be mapped to a TB 2.

If one TB is enabled and the other TB is disabled, the enabled TB may be mapped to a codeword 0 as shown in Table 2.

In the DCI format of Table 24, if the MCS index value of one TB is set to 0 (or the MCS index value is set to 0 and the RV value is set to 1), the TB is enabled and the other TB is disabled, the UE may implicitly recognize single-layer beamforming transmission.

An NDI field of a disabled TB may be interpreted as a layer indicator of an enabled TB. For example, if a TB 1 is enabled and a TB 2 is disabled, the NDI of TB 1 indicates whether data transmitted via the enabled TB 1 is new data or retransmitted data and the NDI field of the TB 2 may be interpreted as a layer indicator (or an antenna port indicator/

RS position) for the TB 1. For example, if the logical value of the NDI of the enabled TB is a first value (0 or off), a first layer (layer X) or a first antenna port (antenna port X) is indicated and, if the logical value of the NDI of the enabled TB is a second value (1 or on), a second layer (layer Y) or a second antenna port (antenna port Y) is indicated. Alternatively, the first value of the logical value of the NDI field may indicate 1 or on, the second value may indicate 0 or off, and the logical value of the NDI field may indicate correspondence between first and second layers. The UE may confirm, to which layer channel information valid with respect to the UE belongs, through information acquired from the layer indicator. The layer indicator may be interpreted as shown in Table 23.

In the new DCI format defined as shown in Table 24, the preceding information field for four antenna ports may be configured as shown in Table 25.

TABLE 25

| One codeword:<br>Codeword 0 (/1) enabled,<br>Codeword 1 (/0) disabled | | Two codeword:<br>Codeword 0 enabled,<br>Codeword 1 enabled | |
| --- | --- | --- | --- |
| Bit field<br>mapped<br>to index | Message | Bit field<br>mapped<br>to index | Message |
| 0 | 1 layer in group 1 | 0 | 2 layers in group 1 |
| 1 | 1 layer in group 2 | 1 | 2 layers in group 2 |
| 2 | 1 layer in group 1<br>(RS overhead Increase) | 2 | 3 layers |
| 3 | 1 layer in group 2<br>(RS overhead Increase) | 3 | 4 layers |

A layer index to which the enabled codeword is mapped and change/non-change in RS overhead may be indicated using the precoding information shown in Table 25. For example, the index of a layer group to which the enabled codeword is mapped and how many layers are transmitted in the layer group may be indicated. In addition to such information, change/non-change in RS overhead may be indicated. In order to inform the Release-9 UE of information indicating that RS overhead is increased, information indicating that RS overhead is increased in transmission of rank may be indicated using a predetermined bit value of a precoding information field.

According to the new DCI format defined as shown in Table 24, the DCI formats for dual-layer beamforming and single-layer beamforming may be set to have the same size so as to implement dynamic mode adaptation of SU-MIMO and MU-MIMO and dynamic rank adaptation of rank 1 and rank 2.

The new DCI formats of Tables 20, 22 and 24 may be referred to as DCI format 2B or DCI format 2C (or other DCI format names) distinguished from the existing DCI formats 2 and 2A and antenna ports X and Y used for dual-layer beamforming may be referred to as antenna ports 7 and 8 distinguished from the antenna ports defined in the existing LTE standard.

According to the various embodiments of the present invention, in order to support dual-layer beamforming, the existing DCI format is newly interpreted and a new DCI format distinguished from the existing DCI format is defined, thereby providing downlink control information to the UE. In particular, it is possible to implicitly determine whether any one of two TBs is disabled using an MCS field of the TB without providing rank information via an explicit rank indicator in dual-layer beamforming. In addition, 1-bit information is necessary to indicate a layer (antenna port) used for transmission using a maximum of two layers. At this time, transmission to two UEs using a single layer may be supported using a method of indicating a layer using an NDI bit field for a disabled TB between two TBs.

DMRS Based MU-MIMO Transmission Scheme

Hereinafter, the proposal of the present invention for signal transmission/reception in a wireless communication system supporting MU-MIMO transmission will be described.

The MIMO system refers to a system for improving data transmission/reception efficiency using multiple transmit antennas and multiple receive antennas. MIMO technology includes a spatial diversity scheme and a spatial multiplexing scheme. The spatial diversity scheme is suitable for transmitting data to a rapidly moving UE because transmission reliability can be increased or cell radius can be increased through diversity gain. The spatial multiplexing scheme can increase a data transfer rate without increasing system bandwidth by simultaneously transmitting different data.

In the MIMO system, each transmit antenna has an independent data channel. The transmit antenna may mean a virtual antenna or a physical antenna. The receiver estimates a channel with respect to each transmit antenna and receives data transmitted from each transmit antenna. Channel estimation refers to a process of compensating for signal distortion generated due to fading and restoring the received signal. Fading refers to a phenomenon wherein a signal level is rapidly changed due to multipath propagation and time delay in a wireless communication system. For channel estimation, there is a need for a reference signal known to both a transmitter and a receiver. In addition, the reference signal may be referred to as an RS or a pilot according to standard.

Among various downlink reference signals, a UE-specific demodulation RS (DMRS) for data demodulation is defined. The DMRS may be called a dedicated RS (DRS) as described above. In MU-MIMO transmission, a UE-specific DMRS may be used. Each UE may perform an MU-MIMO operation without interference with other UEs using channel information acquired through a precoding based DMRS.

In MU-MIMO transmission supporting multiple layers, DMRS overhead and positions of DMRSs on RBs may be changed according to transmission rank. If each UE which performs an MU-MIMO operation is not aware of presence of another UE which performs the MU-MIMO operation, each UE misrecognizes the DMRSs allocated to the RBs for the another UE as DMRSs allocated for data transmission of each UE and malfunction may be caused upon data demodulation. Accordingly, the present invention proposes a method of enabling each UE to accurately operate in MU-MIMO transmission supporting multiple layers.

Figure 7:
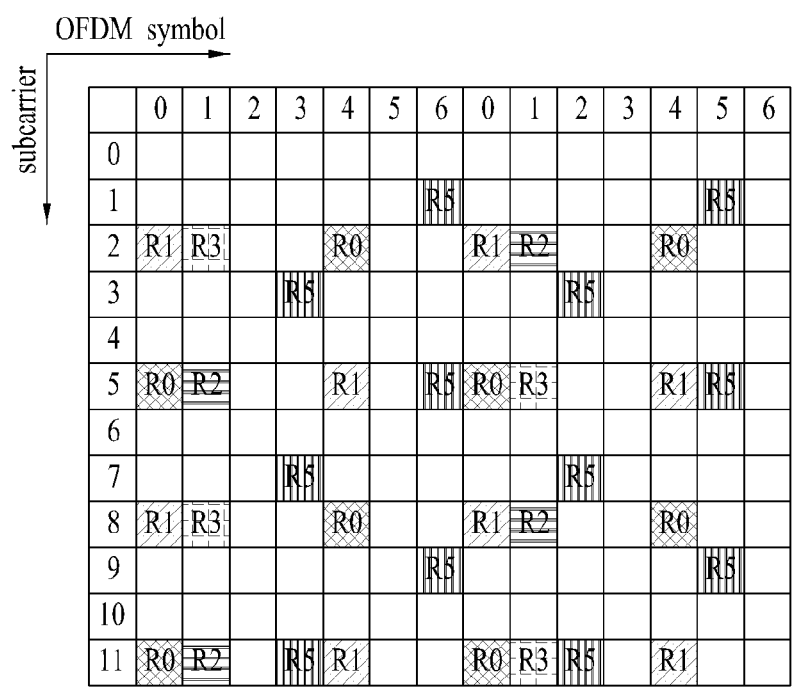
FIG. 7 is a diagram illustrating a reference signal pattern in a 3GPP LTE system.

FIG. 7 is a diagram illustrating a pattern of a common reference signal (CRS) and a dedicated reference signal (DRS) in a 3GPP LTE system (e.g., Release-8). The CRS may be called a cell-specific reference signal and the DRS may be called a UE-specific reference signal.

FIG. 7 is a diagram illustrating REs to which a CRS and a DRS are mapped in a normal CP case. In FIG. 7, a horizontal axis indicates a time domain (OFDM symbol unit) and a vertical axis indicates a frequency domain (subcarrier unit). In association with a reference signal pattern, in the normal CP case, 14 OFDM symbols in the time domain and 12 subcarriers in the frequency domain become a basic unit of an RB. In the extended CP case, 12 OFDM symbols and 12 subcarriers become a basic unit of an RB for a reference signal pattern. Within the time-frequency domain shown in FIG. 7, a smallest rectangular region corresponds to one OFDM symbol in the time domain and corresponds to one subcarrier in the frequency domain.

In FIG. 7, Rp indicates an RE used to transmit a reference signal via a p-th antenna port. For example, R0 to R3 indicate REs to which CRSs transmitted via $0^{th}$ to $3^{rd}$ antenna ports are mapped, and R5 indicates an RE to which a DRS transmitted via a $5^{th}$ antenna port is mapped. The CRSs transmitted via the $0^{th}$ and $1^{st}$ antenna ports are transmitted at an interval of six subcarriers on $0^{th}$, $4^{th}$, $7^{th}$ and $11^{th}$ OFDM symbols (based on one antenna port). CRSs transmitted via $2^{nd}$ and $3^{rd}$ antenna ports are transmitted at an interval of six subcarriers on $1^{st}$ and $8^{th}$ OFDM symbols (based on one antenna port). DRSs are transmitted at an interval of four subcarriers on $3^{rd}$, $6^{th}$, $9^{th}$ and $12^{th}$ OFDM symbols of every subframe. Accordingly, 12 DRSs are transmitted within two RBs (RB pair), which are contiguous in terms of time, of one subframe.

A CRS (or a cell-specific reference signal) is used to estimate the channel of the physical antenna and is commonly transmitted to all UEs located within the cell. Channel information estimated by a UE through a CRS may be used to demodulate data transmitted using transmission methods such as single antenna transmission, transmit diversity, closed-loop spatial multiplexing, open-loop spatial multiplexing, and multi-user MIMO (MU-MIMO), and may be used to enable a UE to measure a channel and report the channel measurement to a base station. In order to enhance channel estimation performance through a CRS, the positions of the CRSs in the subframe may be shifted on a per cell basis to be different from each other. For example, if the RSs are located at an interval of three subcarriers, the CRS may be arranged on a 3k-th subcarrier in a certain cell and the CRS may be located on a (3k+1)-th subcarrier in another cell.

A DRS (or a UE-specific RS) is used for data demodulation and thus may be referred to as a demodulation reference signal (DMRS). By utilizing a preceding weight used for a specific UE upon MIMO transmission in an RS without change, a UE can estimate an equivalent channel, in which the precoding weight transmitted through each transmit antenna and a transmission channel are combined, when receiving the RS. In addition, the DRS requires orthogonality between transmission layers.

A conventional 3GPP LTE system (e.g., a 3GPP LTE Release-8 system) supports a maximum of 4-transmit (Tx) antenna transmission and defines a cell-specific RS for supporting a single Tx antenna, a 2-Tx antenna and a 4-Tx antenna and a UE-specific RS for rank 1 beamforming. Meanwhile, in a 3GPP LTE Release-9 system, one UE may receive transmission of a maximum of rank 2.

Meanwhile, in an LTE-Advanced (LTE-A) system (a 3GPP LTE Release-10 system and a system according to the subsequent standard thereof) which is evolved from the 3GPP LTE system, high order MIMO, multi-cell transmission or advanced multi-user (MU)-MIMO may be considered. Thus, a MIMO scheme for performing transmission of a maximum of rank 8 is applied to one UE. In the LTE-A system, in order to support efficient RS management and an advanced transmission method, data demodulation based on a DRS is considered. As described above, DRS based data demodulation refers to, for example, acquisition of channel information for demodulating downlink data from a DRS in the case in which a UE receives the downlink data from a base station. In addition, the DRS is preferably set such that downlink transmission by a base station is only present in a scheduled resource block and layer. For example, transmission of a maximum of rank 8 based on a DRS indicates that a maximum of eight DRSs is multiplexed with data for a UE and is transmitted.

In arrangement of the DRS for supporting transmission of a maximum of rank 8 on radio resources, DRSs for layers may be multiplexed and arranged. Time division multiplexing (TDM) indicates that DRSs for two or more layers are arranged on different time resources (e.g., OFDM symbols). Frequency division multiplexing (FDM) indicates that DRSs for two or more layers are arranged on different frequency resources (e.g., subcarriers). Code division multiplexing (CDM) indicates that DRSs for two or more layers arranged on the same radio resources are multiplexed using an orthogonal sequence (or orthogonal covering).

Hereinafter, a DMRS will be described in greater detail. As described above, design of a 3GPP LTE-A system supporting a higher uplink/downlink transfer rate than that of the 3GPP LTE system is being discussed. In the 3GPP LTE-A system, downlink MIMO transmission supports a maximum of rank and data demodulation can be performed based on a UE-specific DMRS. Thus, there is a need for design of a DMRS supporting transmission of ranks 1 to 8. DMRSs for transmission of ranks 1 to 2 of LTE-A may be used for dual-layer beamforming of 3GPP LTE Release-9. Prior to description of the DMRSs used for 3GPP LTE-A downlink MIMO transmission, DMRSs used for downlink MIMO transmission of the conventional 3GPP LTE system (release-8 or release-9) will be described.

Even in the 3GPP LTE system which is the previous version of the 3GPP LTE-A system, downlink MIMO transmission was supported. In downlink MIMO transmission of the 3GPP LTE release-8 system, single-layer beamforming based on a precoded DMRS (which may be called a DRS or a UE-specific RS) may be supported. If downlink transmission is performed using the precoded DMRS, since the precoding weight is included in the channel information estimated by a receiver through the precoded MDRS, a transmitter does not need to inform the receiver of information about the precoding weight. As the evolved form of such single-layer beamforming technology, in downlink MIMO transmission of the 3GPP LTE release-9 system, dual-layer (or dual-stream) beamforming may be supported. Dual-layer beamforming technology is a MIMO transmission scheme supporting transmission of a maximum of rank 2 based on a precoded DMRS.

Hereinafter, DMRS design for an LTE-A system will be described.

For downlink MIMO transmission of the LTE-A system, a precoded RS may be used and RS overhead may be reduced by using the precoded RS. Since a DMRS is precoded by the same precoder as a precoder applied to data, a precoding matrix is transparent to a UE. Accordingly, only a DMRS corresponding to a layer is transmitted, but separate precoding information is not transmitted.

DMRS overhead will now be described. DMRS overhead may be defined as the number of REs used for DMRS per RB (e.g., one subframe in a time domain ×12 subcarriers in a frequency domain) in each transmission rank.

In transmission of rank 1, 12 REs may be used for a DMRS in one RB. This is equal to overhead of a DMRS (antenna port index 5) in 3GPP LTE release-8.

In transmission of rank 2 or more, a maximum of 24 REs may be used for a DMRS in one RB. In transmission of rank 2 or more, the same RE may be used for a DMRS per antenna port in each rank.

In addition, the same DMRS pattern may be used regardless of subframe type (a TDD or FDD scheme). If the same DMRS pattern may be used regardless of subframe type, complexity of a UE operation can be reduced.

Hereinafter, details of DMRS design for the LTE-A system will be described from the viewpoint of transmission mode independency, rank independency, subframe independency and DMRS power boosting.

In transmission of a maximum of eight layers in the LTE-A system, a UE-specific precoded DMRS is supported so as to achieve high spectrum efficiency (or bandwidth efficiency). Since a DMRS is UE-specifically defined, it is necessary to determine whether the DMRS is optimized for each transmission mode or the same DMRS is used regardless of transmission mode. In terms of complexity of a UE operation, the unified DMRS capable of performing the same demodulation operation regardless of transmission mode is advantageous. In addition, in light of joint optimization of SU-MIMO, MU-MIMO and Cooperative Multi-Point (CoMP) transmission/reception technology, use of the same DMRS regardless of transmission mode is advantageous in that flexible scheduling is transparently performed with respect to a UE among various transmission modes. Accordingly, as long as performance is not significantly influenced, the same DMRS pattern is preferably used regardless of transmission mode.

Use of the same DMRS pattern regardless of rank may be advantageously used in that a UE can perform the same demodulation process in different transmission modes such as SU-MIMO, MU-MIMO and CoMP transmission/reception technologies. Use of the same DMRS pattern regardless of rank means that the DMRS pattern (e.g., time-frequency position and code) of each layer is the same in all ranks. For example, a channel corresponding to a layer index 1 may be estimated by the same channel estimator regardless of rank. In other words, use of the same DMRS pattern regardless of rank means that the DMRS pattern of low rank is a subset of the DMRS pattern of high rank. If the same DMRS pattern is used regardless of rank, since a UE can perform data demodulation using the same operation in all transmission modes, complexity of a UE operation can be reduced. Accordingly, a fixed DMRS pattern is preferably used with respect to each layer regardless of rank.

In order to use one DMRS pattern regardless of subframe type (an FDD or TDD scheme) and maintain commonality in an FDM scheme and a TDD scheme, it is necessary to appropriately set the positions of OFDM symbols used for DMRS transmission. More specifically, an OFDM symbol used as a guard period for a relay backhaul link (a link between a base station and a relay) subframe, a last OFDM symbol used for synchronization channel transmission in a TDD scheme, etc. may not be used for DMRS transmission. In addition, an OFDM symbol including a cell-specific reference signal (or a CRS) defined in 3GPP LTE Release-8 may not be used for DMRS transmission. This is because, in the case in which power boosting of the cell-specific reference signal is used (reference signal power boosting means that power is borrowed from an RE other than an RE allocated for a reference signal among REs of one OFDM symbol), DMRS transmit power is decreased and demodulation performance is deteriorated when a DMRS is transmitted on the same OFDM symbol as the OFDM symbol on which the cell-specific reference signal is transmitted. Accordingly, in the OFDM symbols to which the guard period of the relay backhaul subframe and the cell-specific reference signal are allocated, the DMRS is preferably set so as not to be transmitted.

As described above, DMRS overhead may be set to 12 REs in one RB in transmission of rank 1 and to a maximum of 24 REs in transmission of higher ranks. However, DMRS transmit power is also considered DMRS overhead. If DMRSs for a plurality of layers are multiplexed using a CDM scheme, since DMRS transmit power is shared among the plurality of layers, channel estimation performance may be deteriorated as the number of layers is increased. Accordingly, DMRS power boosting may be considered.

In light of the above description, several methods of using a DMRS pattern are proposed. As described above, in order to reduce complexity of a UE operation and provide flexibility, a method of multiplexing DMRSs for multiple layers using a CDM scheme may be considered.

Figure 8:
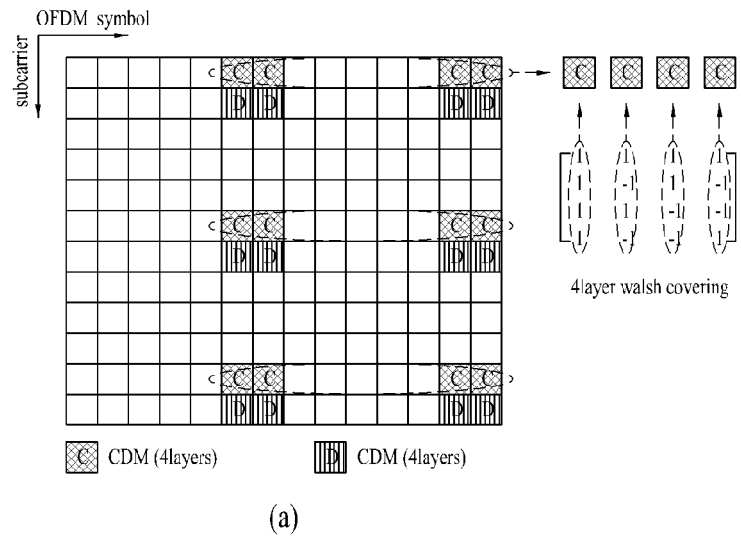
FIGS. 8 and 9 are diagrams illustrating a demodulation reference signal (DMRS) pattern.
Figure 8:
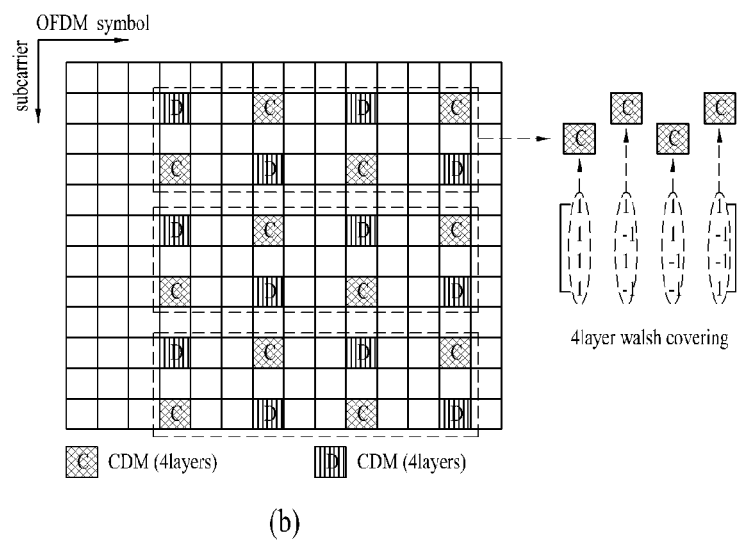
Figure 9:
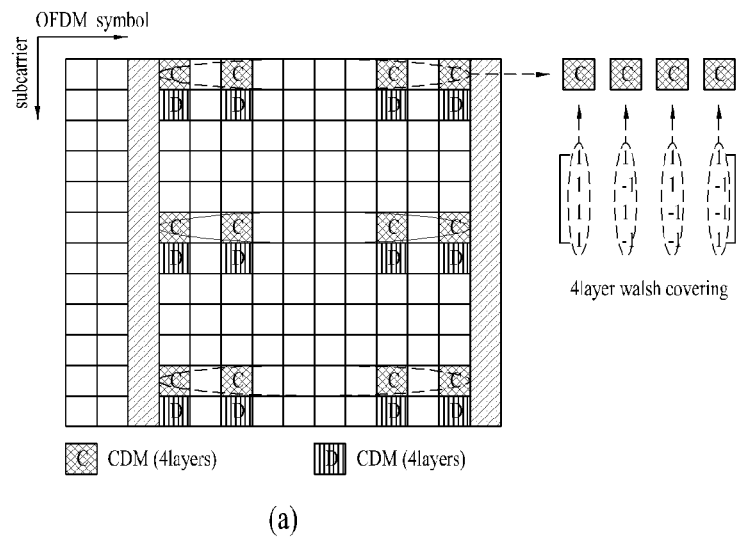
Figure 9:
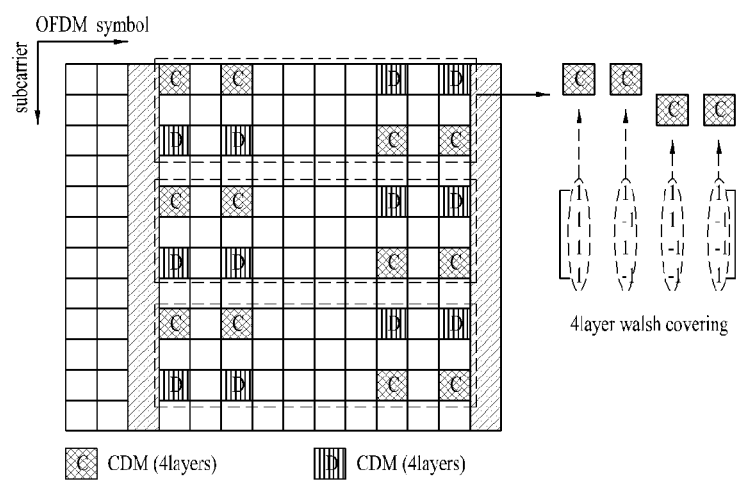

Pattern-1 to Pattern-4 of FIGS. 8 and 9 correspond to candidates of CDM based DMRS patterns supporting a high rank.

In order to set a fixed DMRS pattern for each layer regardless of rank, CDM type multiplexing is applicable to a CDM group including 12 REs. In FIGS. 8 and 9, "C" and "D" indicate CDM groups capable of multiplexing a maximum of four layers. The DMRS patterns shown in FIGS. 8 and 9 may satisfy the above-described transmission mode independency and rank independency DMRS properties.

Representatively, the DMRS pattern of FIG. 8(a) will be described. 12 REs indicated by "C" form one CDM group. In one CDM group, four layers may be multiplexed using a CDM scheme using Walsh covering. In other words, DMRSs for four layers may be arranged on the same RE and DMRSs for the respective layers may be distinguished (or identified) using CDM resources. An orthogonal cover of (1, 1, 1, 1) is multiplied with respect to a first layer, an orthogonal cover of (1, −1, 1, −1) is multiplied with respect to a second layer, an orthogonal cover of (1, 1, −1, −1) is multiplied with respect to a third layer, and an orthogonal cover of (1, −1, −1, 1) is multiplied with respect to a fourth layer. Alternatively, for example, if DMRSs for 3 or less layers are multiplexed, 3 or less orthogonal covers among four different orthogonal covers may be selectively used. For example, if DMRSs for two layers are multiplexed, two DMRSs may be distinguished (or identified) using two (e.g., (1, 1, 1, 1) and (1, −1, 1, −1)) of four different orthogonal covers.

In the DMRS patterns of FIGS. 8 and 9, DMRS overhead may be changed according to transmission rank. As shown in FIGS. 8 and 9, in order to support a maximum of eight layers, two CDM groups are used and each CDM group may support a maximum of four layers. Accordingly, DMRS overhead may be differently defined according to the number of CDM groups. To this end, two schemes may be considered.

First, in case of rank 1 and rank 2, DMRS overhead of 12 REs may be set, and, in case of ranks 3 to 8, DMRS overhead of 24 REs may be set. In such DMRS overhead setting, rank 1 and rank 2 may be defined in one CDM group and two CDM groups may be used from rank 3. Accordingly, in case of rank 3 or more, since robustness in UE mobility may be increased as a large amount of DMRSs is used, it is possible to ensure good performance with respect to low rank. However, RS overhead is too high in case of rank 3 and rank 4.

Alternatively, in case of ranks 1 to 4, DMRS overhead of 12 REs may be set, and, in case of ranks 5 to 8, DMRS overhead of 24 REs may be set. In such DMRS overhead setting, since ranks 1 to 4 may be defined in one CDM group, RS overhead may be decreased as compared to the above-described method from the viewpoint of ranks 3 and 4.

However, in case of a high Doppler frequency, channel estimation performance may be decreased as compared to the above-described method.

In the above-described two methods for DMRS overhead setting, since there is a trade-off between channel estimation performance and RS overhead, it is necessary to appropriately set DMRS overhead in light of channel estimation performance and RS overhead.

Hereinafter, a MU-MIMO transmission scheme will be described in greater detail. As described above, in order to operate MU-MIMO defined in the 3GPP LTE (e.g., Release-8) system, each UE may perform data demodulation using precoding weight information acquired through a control channel and channel information acquired through a cell-specific reference signal. When MU-MIMO is performed in the LTE-A system and the 3GPP LTE Release-9 system in which DMRSs capable of supporting multiple layers are designed, a base station does not need to inform each UE of a precoding weight and each UE may perform an MU-MIMO operation without multi-user interference using channel information acquired through the DMRSs. In order to enable the UE to perform accurate operation, it is necessary to indicate which layer information among channel information of multiple layers acquired from the DMRSs is for a specific UE. Hereinafter, an MU-MIMO design method for the 3GPP LTE Release-9 system and the LTE-A system will be described.

In the 3GPP LTE Release-9 system, dual-layer beamforming extended from single-layer beamforming defined in the 3GPP LTE Release-8 system may be supported using a UE-specific precoded DMRS. Thus, since up to two layers can be supported, SU-MIMO using the precoded DMRS may be supported. In the SU-MIMO scheme using the precoded DMRS, since a precoder may be optimized in a base station in a manner of being transparent to a UE, it is possible to provide better performance as compared to a codebook based SU-MIMO scheme. In order to provide higher system throughput in the 3GPP LTE Release-9 system, MU-MIMO needs to be supported by extending the range of dual-layer beamforming from SU-MIMO to MU-MIMO.

With respect to the MU-MIMO scheme based on dual-layer beamforming in the 3GPP LTE Release-9 system, whether MU-MIMO is supported in dual-layer beamforming, orthogonal DMRS or non-orthogonal DMRS, interference cancellation/suppression in a UE, minimization of influence on the existing standard document, power sharing indicator, etc. may be considered. Hereinafter, such considerations will be described in detail. In addition, advantages of optimization of the MU-MIMO scheme using precoded multi-layer DMRSs will be described.

In the 3GPP LTE Release-8 system, since a spatial division multiple access (SDMA) based MU-MIMO scheme using a precoded DMRS is supported without information about an interference channel, system performance is relatively low and a UE cannot cancel or suppress co-channel interference. Accordingly, restricted performance was provided because system performance depends on an antenna configuration and a scheduler. In order to enhance an MU-MIMO scheme in the 3GPP LTE Release-9 system, better system performance and robustness are preferably provided by allowing interference cancellation/suppression of a UE (as long as there is no influence on the existing standard document).

In support of single-user dual-layer beamforming, in order to support better transmission of rank 2, orthogonal DMRSs may be used. Accordingly, if performance gain can be obtained, orthogonal DMRSs which are already designed for MU-MIMO are preferably maximally used. In order to improve MU-MIMO performance, a signal-to-interference-plus-noise ratio (SINR) of a UE may be increased by cancelling or suppressing co-channel interference. Accordingly, for better performance, orthogonal DMRSs allowing interference channel estimation are preferably used.

As described above, in an SDMA based MU-MIMO scheme in the 3GPP LTE Release-8 system, since co-channel interference cannot be cancelled and/or suppressed in a UE, performance is restricted to a specific level. In order to allow interference cancellation, a modulation and coding scheme (MCS) of another UE co-scheduled in the same physical resource block (PRB) and scheduling information such as channel and rank are necessary and thus excessive signaling overhead may be generated. In addition, if co-scheduled UEs are not allocated to the same PRB, signaling overhead for interference cancellation may become severe. Since interference suppression requires only interference channel information, interference suppression may be preferable to interference cancellation as a method of enhancing MU-MIMO in the 3GPP LTE Release-9 system. If a UE is aware of presence of another UE interfering therewith and a DMRS index associated with RB demodulation of the UE, interference channel estimation may be performed using orthogonal DMRSs. Accordingly, interference suppression is supported in 3GPP LTE Release-9 dual-layer MU-MIMO and control information for interference suppression (a DMRS index and a co-scheduling indicator of the UE) is preferably provided. A determination as to whether explicitly indicated control information is necessary for a UE may be made depending on influence on the existing standard document.

Among control information associated with interference suppression, if a co-scheduled indicator is explicitly transmitted in each scheduled PRB in order to avoid scheduling restriction, signaling overhead may be increased. In this case, a CDM based DMRS may solve such a problem. That is, if the CDM based DMRS is used, the UE can detect co-channel interference with orthogonal DMRSs through energy detection in each scheduled PRB. In addition, if there is another interfering UE, an interference signal can be suppressed in each scheduled PRB. Accordingly, a DMRS indicator using a CDM based orthogonal DMRS can minimize influence on the standard document supporting MU-MIMO. If such approach is applied to SU-MIMO transmission of rank 1, a common PDCCH may be used for SU-MIMO and MU-MIMO.

In the 3GPP LTE Release-8 system, since a CRS is cell-specifically provided, power sharing information may be required for demodulation if quadrature amplitude modulation (QAM) is used. However, if a UE-specific RS is used (since the UE-specific RS is not shared with another UE), power sharing information is implicitly included in an RS. In this case, a UE may estimate that an RE on which data is transmitted and an RE on which a UE-specific RS is transmitted have the same power level. Accordingly, a determination as to whether DMRS power boosting is supported may be made only in order to enhance channel estimation performance and the same is true in case of SU-MIMO. Accordingly, in order to support MU-MIMO, a power sharing indicator may not be specified.

When considering DMRS based MIMO transmission, as described above, DMRS overhead may be differently set according to transmission rank. For example, DMRSs supporting ranks 1 to 2 have constant overhead, but DMRSs supporting rank 3 or more have increased overhead. Alternatively, DMRSs supporting ranks 1 to 4 have constant overhead, but DMRSs supporting rank 5 or more have increased overhead.

If overhead of DMRSs of ranks 1 to 2 are constantly maintained, DMRS overhead may be constantly maintained in data transmission through DMRS based dual-layer beamforming of the 3GPP LTE Release-9 system. When supporting MU-MIMO in the 3GPP LTE Release-9 system, a maximum of two UEs may be multiplexed (each UE performs single-layer transmission), a base station may maintain the positions of the DMRSs on the RB and constant DMRS overhead even in MU-MIMO because DMRSs of rank 2 are transmitted in DMRS based MIMO transmission. The base station indicates a specific layer between two layers to a UE which performs MU-MIMO transmission such that the UE acquires orthogonal channels. If DMRS overhead or the positions of the DMRSs on the RB are not changed, MU-MIMO may be performed using a layer indicator.

Meanwhile, with respect to rank which is a criterion for changing DMRS overhead and the positions of the DMRSs on the RB, if maximum rank supporting MU-MIMO is determined in a range exceeding the criterion, a serious problem may be generated in data demodulation of a UE which performs MU-MIMO. For example, in case of ranks 1 to 2, DMRSs are multiplexed using a CDM group "C" of FIG. 8(a) (that is, using 12 REs in one RB) and, in case of ranks 3 or more, DMRSs are multiplexed using both CDM groups "C" and "D" of FIG. 8(a) (that is, using 24 REs in one RB). In this case, it is assumed that DMRSs are additionally arranged at positions of DMRSs supporting ranks 1 to 2 on the RB, for transmission of rank 3 or more. At this time, if it is assumed that three UEs which receive single-layer transmission are multiplexed so as to perform an MU-MIMO operation, a base station performs data transmission using DMRSs supporting rank 3. UEs (first and second UEs) to which a first layer and a second layer are allocated acquire channels from DMRSs of ranks 1 to 2 and a UE (a third UE) to which a third layer is allocated acquires a channel from the DMRS which is additionally allocated for DMRS of rank 3. As described above, if the layer allocated to each UE is indicated using a layer indicator, the UEs (the first and second UEs) to which the first layer and the second layer are allocated may not recognize presence of the third layer. At this time, since the first and second UEs misrecognize that the REs of the added DMRSs are used to demodulate data, not DMRSs, a serious problem may be generated in data demodulation of the first and second UEs. Accordingly, if DMRS overhead and the positions of the DMRSs on the RB are changed according to rank, it is necessary to inform the UE which performs MU-MIMO of maximum rank.

Embodiment 4

Hereinafter, embodiments of the present invention for DMRS-based MU-MIMO transmission will be described in detail.

In the present invention, a rank indicator is used in order to inform a UE which performs MU-MIMO of maximum rank. In SU-MIMO, the rank indicator may indicate currently transmitted rank. In MU-MIMO, the rank indicator may be used to indicate total rank in which multiple users are multiplexed or the number of layers allocated to a specific UE.

More specifically, the rank indicator may be used to indicate total transmission rank of UEs which are multiplexed for MU-MIMO. For example, if there are M (M≥2) UEs which perform transmission of rank N (N≥1), a base station performs transmission of a total of K (K=N*M) ranks. At this time, the base station informs the UE that transmission of the total of K ranks is performed and a DMRS pattern supporting rank K is used through the rank indicator and the UE recognizes that the DMRS supporting rank K is used. According to such a method, even when the DMRS pattern or overhead is changed according to transmission rank, the UE can distinguish (or identify) between an RE used for DMRS and an RE used for data. The UE can acquire channels of K layers through the DMRSs of rank K and confirm which layer has channel information valid with respect to the UE through information acquired from the layer indicator.

For example, it is assumed that one UE supports transmission of rank 1 if total transmission rank is 3. It is assumed that a base station transmits DMRSs through 12 REs in one RB up to total transmission rank of 2 and transmits DMRSs through 24 REs in one RB in total transmission rank of 3 or more. If information about total transmission rank is not known to a UE which performs MU-MIMO, the UE may misrecognize that data is transmitted at positions other than DMRS positions (12 RE positions in one RB, for example, positions of "C" of FIG. 8(a)) for transmission of rank 1. Accordingly, since the UE performs data demodulation on the assumption that data is transmitted at RE positions where DMRSs for another UE are transmitted (12 additional RE positions in one RB, for example, the positions of "D" of FIG. 8(a)), data cannot be accurately demodulated. In contrast, as described above, if information about total transmission rank is known to the UE, the UE may be aware of RE positions to which DMRSs valid with respect to another UE are allocated in addition to the positions of DMRSs valid with respect to the UE and may recognize that data is not transmitted at those REs. Accordingly, the UE can distinguish between an RE on which DMRS is transmitted and an RE on which data is allocated and accurately perform data demodulation.

If only transmission of a maximum of rank 1 is allowed with respect to each UE which performs an MU-MIMO operation, the UE may acquire only the channel of the layer indicated by a layer indicator.

Meanwhile, if transmission of a maximum of rank P (P≥2) is allowed with respect to each UE which performs an MU-MIMO operation and multi-codeword transmission is allowed with respect to each UE, the UE may acquire channels of P layers from the layer indicated by the layer indicator in ascending order. For example, if data transmission using a maximum of two layers is allowed, channels of a layer indicated by a layer indicator (e.g., a layer index 1) and a next layer (e.g., a layer index 2) thereof may be acquired. Meanwhile, if single-layer transmission is performed in a state of allowing transmission of a maximum of two layers, the UE may perceive transmission of rank 1 through other information. For example, the UE may implicitly confirm whether a codeword is enabled from MCS information of each code and acquire the number of transmission layers. For example, the UE may recognize transmission of rank 2 if two codewords are enabled and may recognize transmission of rank 1 if only one codeword is enabled.

If transmission of a maximum of rank P (P≥2) is allowed with respect to each UE which performs an MU-MIMO operation and single-codeword transmission is allowed with respect to each UE, the UE may acquire channels of P layers from the layer indicated by the layer indicator in ascending order.

In summary, it is possible to provide total transmission rank, information about layers valid with respect to each UE and rank information of each UE to UEs which perform an MU-MIMO operation through the same resources, to distinguish between the positions of DMRSs and data on the RB, and to acquire channel information valid with respect to the UE.

In various embodiments of the present invention, the following settings are applied in association with the rank indicator.

First, up to a maximum of rank 8 may be set to be indicated using a 3-bit rank indicator.

Second, in indication of total rank multiplexed for MU-MIMO using a 2-bit rank indicator, up to a maximum of rank 4 may be set to be indicated.

Third, a 1-bit indicator indicating DMRS overhead or position change may be used without setting a rank indicator. The 1-bit indicator may indicate whether DMRS overhead is increased (or additional DMRS positions) using on/off.

In support of the above-described MU-MIMO operation, a codeword-to-layer mapping relationship needs to be newly defined from the viewpoint of the base station and the UE. This will be described with reference to Tables 26 to 37.

Tables 26 to 31 show codeword-to-layer mapping in the case in which transmission of a maximum of rank P (P≥2) is allowed with respect to each UE which performs an MU-MIMO operation and transmission of multiple codewords (a maximum of two codewords) is allowed with respect to each UE. Tables 26 to 29 show codeword-to-layer mapping in case of maximum transmission ranks 1, 2, 3 and 4 from the viewpoint of the base station. Tables 30 and 31 show codeword-to-layer mapping in case of maximum reception ranks 1 and 2 from the viewpoint of the UE.

TABLE 26

| Max Tx Rank | Codeword to Layer mapping | |
|---|---|---|
| | Codeword | Layer |
| 1 | 1 (for $1^{st}$ UE) | 1 |

TABLE 27

| Max Tx Rank | Codeword to Layer mapping | |
|---|---|---|
| | Codeword | Layer |
| 2 | 1 (for $1^{st}$ UE) | 1 |
| | 1 (for $2^{nd}$ UE) | 2 |

TABLE 28

| Max Tx Rank | Codeword to Layer mapping | |
|---|---|---|
| | Codeword | Layer |
| 3 (case 1) | 1 (for $1^{st}$ UE) | 1 |
| | 1 (for $2^{nd}$ UE) | 2 |
| | 1 (for $3^{rd}$ UE) | 3 |

TABLE 28-continued

| Max Tx Rank | Codeword to Layer mapping | |
|---|---|---|
| | Codeword | Layer |
| 3 (case 2) | 1 (for $1^{st}$ UE) | 1 |
| | 1 (for $2^{nd}$ UE) | 2 |
| | 2 (for $2^{nd}$ UE) | 3 |

TABLE 29

| Max Tx Rank | Codeword to Layer mapping | |
|---|---|---|
| | Codeword | Layer |
| 4 (case 1) | 1 (for $1^{st}$ UE) | 1 |
| | 1 (for $2^{nd}$ UE) | 2 |
| | 1 (for $3^{rd}$ UE) | 3 |
| | 1 (for $4^{th}$ UE) | 4 |
| 4 (case 2) | 1 (for $1^{st}$ UE) | 1 |
| | 1 (for $2^{nd}$ UE) | 2 |
| | 1 (for $3^{rd}$ UE) | 3 |
| | 2 (for $3^{rd}$ UE) | 4 |
| 4 (case 3) | 1 (for $1^{st}$ UE) | 1 |
| | 2 (for $1^{st}$ UE) | 2 |
| | 1 (for $2^{nd}$ UE) | 3 |
| | 2 (for $2^{nd}$ UE) | 4 |

TABLE 30

| Max Rx Rank | Codeword to Layer mapping | |
|---|---|---|
| | Codeword | Layer |
| 1 | 1 | 1 |

TABLE 31

| Max Rx Rank | Codeword to Layer mapping | |
|---|---|---|
| | Codeword | Layer |
| 2 | 1 | 1 |
| | 2 | 2 |

Tables 32 to 37 show codeword-to-layer mapping in the case in which transmission of a maximum of rank P (P≥2) is allowed with respect to each UE which performs an MU-MIMO operation and transmission of single codeword (one codeword) is allowed with respect to each UE. Tables 32 to 35 show codeword-to-layer mapping in case of maximum transmission ranks 1, 2, 3 and 4 from the viewpoint of the base station. Tables 36 and 37 show codeword-to-layer mapping in case of maximum reception ranks 1 and 2 from the viewpoint of the UE.

TABLE 32

| Max Tx Rank | Codeword to Layer mapping | |
|---|---|---|
| | Codeword | Layer |
| 1 | 1 (for $1^{st}$ UE) | 1 |

TABLE 33

| Max Tx Rank | Codeword to Layer mapping | |
|---|---|---|
| | Codeword | Layer |
| 2 | 1 (for $1^{st}$ UE) | 1 |
| | 1 (for $2^{nd}$ UE) | 2 |

TABLE 34

| Max Tx Rank | Codeword to Layer mapping | |
|---|---|---|
| | Codeword | Layer |
| 3 (case 1) | 1 (for $1^{st}$ UE) | 1 |
| | 1 (for $2^{nd}$ UE) | 2 |
| | 1 (for $3^{rd}$ UE) | 3 |
| 3 (case 2) | 1 (for $1^{st}$ UE) | 1 |
| | 1 (for $2^{nd}$ UE) | 2 |
| | | 3 |

TABLE 35

| Max Tx Rank | Codeword to Layer mapping | |
|---|---|---|
| | Codeword | Layer |
| 4 (case 1) | 1 (for $1^{st}$ UE) | 1 |
| | 1 (for $2^{nd}$ UE) | 2 |
| | 1 (for $3^{rd}$ UE) | 3 |
| | 1 (for $4^{th}$ UE) | 4 |
| 4 (case 2) | 1 (for $1^{st}$ UE) | 1 |
| | 1 (for $2^{nd}$ UE) | 2 |
| | 1 (for $3^{rd}$ UE) | 3 |
| | | 4 |
| 4 (case 3) | 1 (for $1^{st}$ UE) | 1 |
| | | 2 |
| | 2 (for $2^{nd}$ UE) | 3 |
| | | 4 |

TABLE 36

| Max Rx Rank | Codeword to Layer mapping | |
|---|---|---|
| | Codeword | Layer |
| 1 | 1 | 1 |

TABLE 37

| Max Rx Rank | Codeword to Layer mapping | |
|---|---|---|
| | Codeword | Layer |
| 2 | 1 | 1 |
| | | 2 |

The codeword-to-layer mapping relationship in case of maximum reception rank 2 may be used not only for initial transmission but also for retransmission in MU-MIMO transmission from the viewpoint of the UE shown in Tables 26 and 37.

Control Information Simultaneously Supporting SU-MIMO and MU-MIMO

In the above-described various embodiments of the present invention, in a system supporting dual-layer beamforming based on DMRS, a method of indicating a layer to be read for data demodulation among DMRSs used for transmission is proposed. If dual-layer beamforming transmission is performed, DMRSs may be transmitted through REs in one RB and DMRSs for each layer may be distinguished (or identified) using two orthogonal cover codes (OCCs). That is, two OCCs may be used as orthogonal resources for distinguishing (or identifying) DMRSs. In addition, as a method of indicating valid DMRSs among transmitted DMRS resources when MU-MIMO transmission is performed using dual layers, an NDI bit of a disabled codeword may be used.

A DMRS pattern will be described with reference to FIG. 8(a). In FIG. 8(a), DMRSs may be mapped to 24 REs in one RB. In FIG. 8(a), the 12 REs corresponding to the CDM group "C" and the 12 REs corresponding to the CDM group "D" are distinguished (or identified) in the time/frequency domain. In groups "C" and "D", four different DMRSs may be distinguished (or identified) using orthogonal code resources. In FIG. 8(a), four different DMRSs are distinguished (or identified) using four orthogonal Walsh codes. In FIG. 8(a), four different DMRSs are distinguished (identified) using four orthogonal Walsh codes.

Alternatively, one DMRS CDM group may be divided into two subgroups. The two subgroups are quasi-orthogonal to each other. Two layers (or antenna ports) may be distinguished (or identified) using fully orthogonal sequences within one subgroup. Two fully orthogonal sequences may be {1, 1, 1, 1} and {1, −1, 1, −1}, for example. In other words, DMRSs distinguished (or identified) by the two fully orthogonal sequences are DMRSs for different antenna ports (e.g., {1, 1, 1, 1} code resources are used with respect to an antenna port X and {1, −1, 1, −1} is used with respect to an antenna port Y), two DMRSs are distinguished (or identified) using quasi-orthogonal code resources with respect to the respective antenna ports (e.g., two DMRSs which are distinguished (or identified) are present with respect to the antenna port X and two DMRSs which are distinguished (or identified) are present with respect to the antenna port Y). In summary, on one DMRS CDM group (e.g., "C") composed of 12 REs, a total of four different DMRSs may be distinguished (or identified) by code resources. Meanwhile, the CDM groups "C" and "D" may be called group 1 and group 2, respectively. As resources for distinguishing between DMRSs, since two groups may be used and four orthogonal resources may be used per group, a total of eight orthogonal resources is secured.

It is assumed that 12 REs are used for DMRS transmission in ranks 1 and 2 and 24 REs are used for DMRS transmission in rank 3 or more. While only one group (that is, "C") is used for DMRS transmission up to rank 2, two groups (that is, "C" and "D") are used for DMRS transmission in rank 3 or more. For example, if DMRSs are transmitted to first to fourth layers in transmission of rank 4, DMRSs for any two layers (e.g., first and second layers) are mapped to one group (e.g., "C") and are distinguished (or identified) using OCCs and DMRSs for the remaining two layers (e.g., third and fourth layers) are mapped to another group (e.g., "D") and are distinguished (or identified) using OCCs.

If MU-MIMO transmission using a maximum of four layers is performed from the viewpoint of a transmitter, DMRSs for distinguishing (or identifying) four layers are used. At this time, each receiver needs to acquire information about a layer corresponding thereto. As described above, according to the method of indicating the layer using an NDI bit (1 bit) of a disabled codeword, since up to two UEs each using a single layer can be supported, there is a need for a method of indicating extended layers.

First, a CDM group indication bit may be defined. For example, the UE may be informed of which of the first and second CDM groups (e.g., "C" or "D" of FIG. 8(a)) the layer belongs to through a 1-bit indicator. One group is composed of 12 REs and a maximum of four DMRSs may be multiplexed (that is, distinguished) using a CDM scheme and transmitted via each group. In case of MU-MIMO transmission of a maximum of four layers, two DMRSs may be multiplexed using two orthogonal codes using a CDM scheme in one group. If a group is determined through a 1-bit group indicator, one of the two orthogonal codes may be determined using an NDI (1 bit) of a disabled codeword. In addition, if a determination as to which group is used is made using a 1-bit group indicator and two codewords are enabled, two orthogonal codes are used and thus the orthogonal codes do not need to be indicated. By defining a 1-bit group indicator, a signaling method capable of efficiently supporting MU-MIMO transmission with a maximum of four layers may be provided.

Hereinafter, a method of supporting SU-MIMO and MU-MIMO transmission using the same control information format in a system which uses two codewords and supports a maximum of rank N (N≤8) will be described. Matters to be included in such control information will be described first and a method of configuring a detailed control information format will then be described.

(1) As control information for MIMO transmission, rank and precoding information are basically necessary.

(2) Rank information indicates the number of virtual antennas (or streams or layers) used for transmission. When data is demodulated using a MIMO receiver, the number of layers to be subjected to data demodulation is determined based on rank information. From the viewpoint of a single user, rank information may be referred to as "the number of layers to be received by one user". If MU-MIMO is applied, a transmitter may transmit data to a plurality of receivers (several users) using multiple layers. Accordingly, from the viewpoint of multiple users (or from the viewpoint of an MU-MIMO transmitter), rank information may be referred to as "the number of all layers used for transmission".

(3) Precoding information refers to information about a precoding weight used for signal transmission by a transmitter. In order to reduce the size of the indication bit for the precoding weight, a method of defining a codebook type precoding weight in advance and reporting a codebook index corresponding to the precoding information used for transmission may be considered. A receiver may perform data demodulation by coupling the information about the precoding weight indicated by the transmitter and channel information acquired through a reference signal. Meanwhile, a dedicated reference signal (or a demodulation reference signal) is precoded by the same precoder as transmitted data. Accordingly, if a dedicated reference signal for a certain user is used, information about the precoding weight is not separately signaled.

(4) In a system which uses a dedicated reference signal, only rank information may be basically indicated for MIMO transmission. For example, in a system for performing transmission of a maximum of rank 2, a 1-bit rank indicator is necessary to indicate rank. A 2-bit rank indicator is necessary in a system for performing transmission of a maximum of rank 4 and a 3-bit rank indicator is necessary in a system for performing transmission of a maximum of rank 8.

(5) The following matters may be considered in multi-codeword (MCW) transmission. Multi-antenna transmission may support transmission using a single layer and transmission using multiple layers. When performing transmission using multiple layers, different MCSs are applicable to the layers. Transmission for applying multiple MCSs to multiple layers may be referred to as MCW transmission. If MCSs are applied to multiple layers, signaling overhead can be increased and thus some of the multiple layers may be designed to have the same MCS. For example, in a system for transmitting two layers, the respective layers may have different MCSs. In a system for transmitting three layers, any one layer may be allocated an MCS for the layer and the remaining two layers may be allocated an MCS suitable for the channel status of the two layers. The two layers may be designed to have the same MCS. Meanwhile, a bit indicating an MCS may include MCS level and codeword disable information.

(6) In a system for transmitting two codewords, when two MCS indicators are allocated to a control channel for transmission (each MCS indicator includes indication information of codeword disability) and any one MCS indicator indicates codeword disability, a receiver may recognize that one codeword is not transmitted but only another codeword is transmitted. In addition, if the two MCS indicators indicate certain MCS levels, the receiver may recognize that two codewords are transmitted.

(7) In the case where MCW transmission is performed in a system supporting transmission of a maximum of rank 2, an MCS indicator for each layer may be used. 1 bit may be allocated as an indicator for transmission rank. However, in transmission of a maximum of rank 2, even when an indicator for transmission rank is not allocated, a determination as to whether single-layer transmission or 2-layer transmission is performed is made depending on whether a codeword is enabled. If each codeword is transmitted via each layer, transmission rank can be conformed depending on which codeword is enabled. In particular, in the case in which transmission of a maximum of rank 2 is performed in a system having two codewords, only one codeword is enabled in transmission of rank 1 and two codewords are enabled in transmission of rank 2. Accordingly, in a system in which each codeword is transmitted via each layer while supporting multiple codewords, since transmission rank information can be acquired via information included in an MCS indicator, rank information may not be separately signaled.

(8) In the case in which MIMO transmission is performed using a dedicated reference signal (DRS or DMRS), orthogonal resources (distinguishable resources) for the reference signal are equal to the number of layers used for MIMO transmission. Orthogonal resources for distinguishing (or identifying) reference signals may be code resources, frequency resources and/or time resources. For example, in case of transmission of rank 2, two orthogonal resources are required for a dedicated reference signal. However, in MU-MIMO, orthogonal resources corresponding in number to the number of layers transmitted to multiple users are required for the dedicated reference signal. For example, in the case in which transmission of rank 2 is performed with respect to two users, a total of four orthogonal resources are used for the dedicated reference signal.

(9) In order to enable a receiver to demodulate signals in an MU-MIMO system which uses a dedicated reference signal, it is necessary to distinguishably (identifiably) indicate reference signals of multiple users. For example, when signals are simultaneously transmitted to two users for performing transmission of rank 1, two orthogonal resources are used. If the order of the two orthogonal resources is set, it is necessary to inform each user of the order of orthogonal resources corresponding to the signal thereof.

If the DMRS group indication bit, the rank indication bit used for SU-MIMO transmission and the rank indication bit indicating all layers used for MU-MIMO transmission are all defined, clear control information for MIMO transmission is provided, but signaling overhead is significantly increased. In the present invention, an efficient control information signaling method capable of reducing signaling overhead while simultaneously supporting SU-MIMO and MU-MIMO is proposed as follows.

Embodiment 5

The present embodiment relates to a method of indicating rank and layer used for transmission with respect to transmission of rank 1 and rank 2 and configuring control information indicating only transmission rank information.

For example, in MU-MIMO transmission, it is assumed that each receiver may receive a maximum of 2 layers and a transmitter may transmit a maximum of four layers. In this case, there is a need for an indication bit for distinguishing (or identifying) four layers for UEs which participate in MU-MIMO. In the case of applying the above-described indication method for MIMO transmission, control information may be provided such that a receiver recognizes statuses A to D of Table 38.

TABLE 38

| | Group 1 | | Group 2 | |
|---|---|---|---|---|
| | OCC #1 | OCC #2 | OCC #1 | OCC #2 |
| A | 2-layers | | 2-layers | |
| B | 1-layer | 1-layer | 2-layers | |
| C | 2-layers | | 1-layer | 1-layer |
| D | 1-layer | 1-layer | 1-layer | 1-layer |
| E | 1-layer | 2-layers | | 1-layer |

Table 39 shows an example of a codeword-to-layer mapping rule of transmission of a maximum of eight layers.

TABLE 39

| | CW to Layer mapping rule (codeword number) - (layer number) | |
|---|---|---|
| # of layers | One codeword | Two Codeword |
| 1 | (1) - (1) | X |
| 2 | (1) - (1, 2) | (1) - (1) |
| | | (2) - (2) |
| 3 | (1) - (1, 2, 3) | (1) - (1) |
| | | (2) - (2, 3) |
| 4 | (1) - (1, 2, 3, 4) | (1) - (1, 2) |
| | | (2) - (3, 4) |
| 5 | | (1) - (1, 2) |
| | | (2) - (3, 4, 5) |
| 6 | | (1) - (1, 2, 3) |
| | | (2) - (4, 5, 6) |
| 7 | | (1) - (1, 2, 3) |
| | | (2) - (4, 5, 6, 7) |
| 8 | | (1) - (1, 2, 3, 4) |
| | | (2) - (5, 6, 7, 8) |

In the a codeword-to-layer mapping rule shown in Table 39, data may be transmitted with rank 1, 2, 3 or 4 if one codeword is enabled and data may be transmitted with rank 2, 3, 4, 5, 6, 7 or 8 if two codewords are enabled. Accordingly, definition of transmission rank according to the number of enabled codewords is expressed as shown in Table 40.

TABLE 40

| One codeword: Codeword 0 (/1) enabled, Codeword 1 (/0) disabled | | Two codeword: Codeword 0 enabled, Codeword 1 enabled | |
|---|---|---|---|
| Bit field mapped to index | Message | Bit field mapped to index | Message |
| 0 | 1 layer | 0 | 2 Layers |
| 1 | 2 Layers | 1 | 3 Layers |
| 2 | 3 Layers | 2 | 4 Layers |
| 3 | 4 Layers | 3 | 5 Layers |
| 4 | | 4 | 6 Layers |
| 5 | | 5 | 7 Layers |
| 6 | | 6 | 8 Layers |
| 7 | | 7 | |

Table 40 shows precoding information supporting eight antenna ports. One to eight layer(s) of Table 40 indicate the number of layers used to transmit data from the viewpoint of a single user. As shown in Table 40, a minimum of 3 bits is required to indicate rank information. In the case in which 3 bits are used, four fields may be reserved if one codeword is enabled and one field may be reserved if two codewords are enabled.

In the case in which a rank indicator is used for transmission of up to rank 4, 2 bits may be used as a rank indicator. The rank indicator of 2 bits may be configured as shown in Table 41. Table 41 shows precoding information supporting four antenna ports.

TABLE 41

| One codeword: Codeword 0 (/1) enabled, Codeword 1 (/0) disabled | | Two codeword: Codeword 0 enabled, Codeword 1 enabled | |
|---|---|---|---|
| Bit field mapped to index | Message | Bit field mapped to index | Message |
| 0 | 1 layer | 0 | 2 Layers |
| 1 | 2 Layers | 1 | 3 Layers |
| 2 | | 2 | 4 Layers |
| 3 | | 3 | |

As shown in Table 41, one field may be reserved if one codeword is enabled and one field may be reserved if two codewords are enabled.

Meanwhile, in the case in which a rank indicator is used for transmission of up to rank 2, 1 bit may be used as a rank indicator. The rank indicator of 1 bit may be configured as shown in Table 42. Table 42 shows precoding information supporting two antenna ports.

TABLE 42

| One codeword: Codeword 0 (/1) enabled, Codeword 1 (/0) disabled | | Two codeword: Codeword 0 enabled, Codeword 1 enabled | |
|---|---|---|---|
| Bit field mapped to index | Message | Bit field mapped to index | Message |
| 0 | 1 layer | 0 | 2 Layers |

As shown in Table 42, in the case in which transmission is performed through two antenna ports, it is recognized that transmission of rank 1 is performed if one codeword is enabled and transmission of rank 2 is performed if two codewords are enabled. Accordingly, it is possible to accurately perform an operation even when a separate bit indicating rank is not defined.

Next, a method of defining a layer indication in a precoding information field is proposed as follows.

In the case in which MU-MIMO is applied in transmission of ranks 1 and 2 and SU-MIMO is applied in transmission of rank 3 or more, the precoding information field for eight antenna ports may be configured as shown in Table 43.

TABLE 43

| One codeword: Codeword 0 (/1) enabled, Codeword 1 (/0) disabled | | Two codeword: Codeword 0 enabled, Codeword 1 enabled | |
| --- | --- | --- | --- |
| Bit field mapped to index | Message | Bit field mapped to index | Message |
| 0 | 1 layer in $1^{st}$ group | 0 | 2 Layers in $1^{st}$ group |
| 1 | 1 layer in $2^{nd}$ group | 1 | 2 Layers in $2^{nd}$ group |
| 2 | 2 Layers | 2 | 3 Layers |
| 3 | 3 Layers | 3 | 4 Layers |
| 4 | 4 Layers | 4 | 5 Layers |
| 5 | | 5 | 6 Layers |
| 6 | | 6 | 7 Layers |
| 7 | | 7 | 8 Layers |

Meanwhile, when one codeword is enabled, MIMO transmission of rank 2, 3 or 4 is possible. When one codeword is enabled, it is possible to indicate a group, to which two layers are allocated, in order to enable MU-MIMO transmission in transmission of rank 2. In this case, the precoding information for eight antenna ports may be configured as shown in Table 44.

TABLE 44

| One codeword: Codeword 0 (/1) enabled, Codeword 1 (/0) disabled | | Two codeword: Codeword 0 enabled, Codeword 1 enabled | |
| --- | --- | --- | --- |
| Bit field mapped to index | Message | Bit field mapped to index | Message |
| 0 | 1 layer in $1^{st}$ group | 0 | 2 Layers in $1^{st}$ group |
| 1 | 1 layer in $2^{nd}$ group | 1 | 2 Layers in $2^{nd}$ group |
| 2 | 2 Layers in $1^{st}$ group | 2 | 3 Layers |
| 3 | 2 Layers in $2^{nd}$ group | 3 | 4 Layers |
| 4 | 3 Layers | 4 | 5 Layers |
| 5 | 4 Layers | 5 | 6 Layers |
| 6 | | 6 | 7 Layers |
| 7 | | 7 | 8 Layers |

In the case in which a UE demodulates data via DMRSs, it is assumed that a maximum number of REs is used for DMRSs. For example, when a DMRS CDM group 1 is indicated with respect to an arbitrary UE, data demodulation may be performed in consideration of an RE position (e.g., a DMRS CDM group 2), to which DMRSs for another UE are mapped, other than an RE for data and a reference signal. A coding rate of transmitted information may be calculated in consideration of the maximum number of REs of DMRSs and the information may be encoded and decoded according to the coding rate. With respect to a UE belonging to the DMRS CDM group 1, encoding/decoding may be performed in consideration of the number of REs for transmission of rank 1 or 2 (e.g., in the case in which a total of 24 REs is used for DMRS transmission, only 12 REs are used when transmission of rank 1 or 2 is performed).

Meanwhile, in the case in which MU-MIMO is applied in transmission of ranks 1 and 2 and SU-MIMO is applied in transmission of rank 3 or more, the precoding information field for four antenna ports may be configured as shown in Table 45.

TABLE 45

| One codeword: Codeword 0 (/1) enabled, Codeword 1 (/0) disabled | | Two codeword: Codeword 0 enabled, Codeword 1 enabled | |
| --- | --- | --- | --- |
| Bit field mapped to index | Message | Bit field mapped to index | Message |
| 0 | 1 layer in $1^{st}$ group | 0 | 2 Layers in $1^{st}$ group |
| 1 | 1 layer in $2^{nd}$ group | 1 | 2 Layers in $2^{nd}$ group |
| 2 | 2 Layers | 2 | 3 Layers |
| 3 | | 3 | 4 Layers |

Meanwhile, when one codeword is enabled, it is possible to indicate a group, to which two layers are allocated, in order to enable MU-MIMO transmission in transmission of rank 2. In this case, the precoding information for four antenna ports may be configured as shown in Table 46.

TABLE 46

| One codeword: Codeword 0 (/1) enabled, Codeword 1 (/0) disabled | | Two codeword: Codeword 0 enabled, Codeword 1 enabled | |
| --- | --- | --- | --- |
| Bit field mapped to index | Message | Bit field mapped to index | Message |
| 0 | 1 layer in $1^{st}$ group | 0 | 2 Layers in $1^{st}$ group |
| 1 | 1 layer in $2^{nd}$ group | 1 | 2 Layers in $2^{nd}$ group |
| 2 | 2 Layers in $1^{st}$ group | 2 | 3 Layers |
| 3 | 2 Layers in $2^{nd}$ group | 3 | 4 Layers |

The precoding information fields configured as shown in Tables 39 to 46 may be included in a downlink control information (DCI) format. The precoding information field indicates that the control information to be included in the DCI format proposed by the present invention reuses the "precoding information field" of the existing DCI format 2A. That is, control information proposed by the present invention has a format similar to the format of "precoding information" included in the existing DCI format 2A and substantially indicates a group, to which a layer (or an antenna port) for transmitting transmission rank and data belongs, if only one codeword is enabled or if two codewords are enabled. Accordingly, the term control information may be changed. For example, the control information shown in Tables 39 to 46 may be included as control information indicating a group to which transmission rank and layer belongs in the modified DCI format of the existing DCI format 2A, which is proposed by the present invention, or a newly proposed DCI format.

Embodiment 6

The present embodiment relates to a method of configuring control information when MU-MIMO is applied within the same CDM group in the case of indicating rank and layer used for transmission with respect to transmission of rank 1 and rank 2 and indicating transmission rank information with respect to transmission of rank 3 or more. Application of MU-MIMO within the same CDM group means that dedicated reference signals for one or more layers of multiple users are transmitted on the same CDM group (e.g., "C" of FIG. 8(a)).

For example, in MU-MIMO transmission applied within the same CDM group, it is assumed that each receiver may receive a maximum of 2 layers and a transmitter may transmit a maximum of four layers. In this case, there is a need for an indication bit for distinguishing (or identifying) four layers for UEs which participate in MU-MIMO. In the case of applying the above-described indication method for MIMO transmission, control information may be provided such that a receiver recognizes statuses A to D of Table 47. Although MU-MIMO transmission is performed within the group 1 in Table 47, this is for an arbitrary group and thus the present invention is not limited thereto.

TABLE 47

|   | A-subgroup in Group 1 | | B-subgroup in Group 1 | |
| --- | --- | --- | --- | --- |
|   | OCC #1 | OCC #2 | OCC #3 | OCC #4 |
| A | 2-layers | | 2-layers | |
| B | 1-layer | 1-layer | 2-layers | |
| C | 2-layers | | 1-layer | 1-layer |
| D | 1-layer | 1-layer | 1-layer | 1-layer |
| E | 1-layer | 2-layers | | 1-layer |

Dedicated reference signals for four layers belonging to a predetermined group may be distinguished (or identified) using four orthogonal codes. Four orthogonal codes may be divided into two subgroups (e.g., A-subgroup and B-subgroup as shown in Table 47). For example, one group may be divided into two subgroups and the two subgroups are quasi-orthogonal to each other. Two layers may be distinguished (or identified) using fully orthogonal sequences within one subgroup. The orthogonal code for each layer may be determined according to an antenna port mapping rule of DMRS.

It is assumed that MU-MIMO is applied in transmission of rank 1 and 2, SU-MIMO is applied in transmission of rank 3 or more, and MU-MIMO is performed only in one group (e.g., a group 1). In this case, the number of REs used for DMRS may be restricted to 12. Thus, the precoding information field for eight antenna ports may be configured as shown in Table 48.

TABLE 48

| One codeword: Codeword 0 (/1) enabled, Codeword 1 (/0) disabled | | Two codeword: Codeword 0 enabled, Codeword 1 enabled | |
| --- | --- | --- | --- |
| Bit field mapped to index | Message | Bit field mapped to index | Message |
| 0 | 1 layer in subgroup-A | 0 | 2 Layers in subgroup-A |
| 1 | 1 layer in subgroup-B | 1 | 2 Layers in subgroup-B |
| 2 | 2 Layers | 2 | 3 Layers |
| 3 | 3 Layers | 3 | 4 Layers |
| 4 | 4 Layers | 4 | 5 Layers |
| 5 | | 5 | 6 Layers |
| 6 | | 6 | 7 Layers |
| 7 | | 7 | 8 Layers |

Meanwhile, when one codeword is enabled, MIMO transmission of rank 2, 3 or 4 is possible. When one codeword is enabled, it is possible to indicate a subgroup, to which two layers are allocated, in order to enable MU-MIMO transmission in transmission of rank 2. In this case, in consideration of the case in which MU-MIMO is applied within a predetermined group, the precoding information for eight antenna ports may be configured as shown in Table 49.

TABLE 49

| One codeword: Codeword 0 (/1) enabled, Codeword 1 (/0) disabled | | Two codeword: Codeword 0 enabled, Codeword 1 enabled | |
| --- | --- | --- | --- |
| Bit field mapped to index | Message | Bit field mapped to index | Message |
| 0 | 1 layer in subgroup-A | 0 | 2 Layers in subgroup-A |
| 1 | 1 layer in subgroup-B | 1 | 2 Layers in subgroup-B |
| 2 | 2 Layers in subgroup-A | 2 | 3 Layers |
| 3 | 2 Layers in subgroup-B | 3 | 4 Layers |
| 4 | 3 Layers | 4 | 5 Layers |
| 5 | 4 Layers | 5 | 6 Layers |
| 6 | | 6 | 7 Layers |
| 7 | | 7 | 8 Layers |

The UE may perform encoding/decoding in consideration of the number of REs for transmission of rank 1 or rank 2 (e.g., in the case in which a total of 24 REs is used for DMRS transmission, only 12 REs are used when transmission of rank 1 or 2 is performed).

Meanwhile, in the case in which MU-MIMO is applied in transmission of ranks 1 and 2 and SU-MIMO is applied in transmission of rank 3 or more, in consideration of the case in which MU-MIMO is applied within a predetermined group, the precoding information field for four antenna ports may be configured as shown in Table 50.

TABLE 50

| One codeword: Codeword 0 (/1) enabled, Codeword 1 (/0) disabled | | Two codeword: Codeword 0 enabled, Codeword 1 enabled | |
| --- | --- | --- | --- |
| Bit field mapped to index | Message | Bit field mapped to index | Message |
| 0 | 1 layer in subgroup-A | 0 | 2 Layers in subgroup-A |
| 1 | 1 layer in subgroup-B | 1 | 2 Layers in subgroup-B |
| 2 | 2 Layers | 2 | 3 Layers |
| 3 | | 3 | 4 Layers |

Meanwhile, when one codeword is enabled, it is possible to indicate a group, to which two layers are allocated, in order to enable MU-MIMO transmission in transmission of rank 2. In this case, in consideration of the case in which MU-MIMO is applied within a predetermined group, the precoding information for four antenna ports may be configured as shown in Table 51.

TABLE 51

| One codeword: Codeword 0 (/1) enabled, Codeword 1 (/0) disabled | | Two codeword: Codeword 0 enabled, Codeword 1 enabled | |
| --- | --- | --- | --- |
| Bit field mapped to index | Message | Bit field mapped to index | Message |
| 0 | 1 layer in subgroup-A | 0 | 2 Layers in subgroup-A |
| 1 | 1 layer in subgroup-B | 1 | 2 Layers in subgroup-B |

TABLE 51-continued

| One codeword: Codeword 0 (/1) enabled, Codeword 1 (/0) disabled | | Two codeword: Codeword 0 enabled, Codeword 1 enabled | |
| --- | --- | --- | --- |
| Bit field mapped to index | Message | Bit field mapped to index | Message |
| 2 | 2 Layers in subgroup-A | 2 | 3 Layers |
| 3 | 2 Layers in subgroup-B | 3 | 4 Layers |

The precoding information fields configured as shown in Tables 48 to 51 may be included in a downlink control information (DCI) format. The precoding information field indicates that the control information to be included in the DCI format proposed by the present invention reuses the "precoding information field" of the existing DCI format 2A. That is, control information proposed by the present invention has a format similar to the format of "precoding information" included in the existing DCI format 2A and, as described above, substantially indicates a subgroup, to which a layer (or an antenna port) for transmitting transmission rank and data belongs, if only one codeword is enabled or if two codewords are enabled. Accordingly, the term control information may be changed. For example, the control information shown in Tables 48 to 51 may be included as control information indicating a subgroup to which transmission rank and layer belongs in the modified DCI format of the existing DCI format 2A, which is proposed by the present invention, or a newly proposed DCI format.

In the case in which a group to which a MIMO transmission layer for a UE belongs is indicated as in Embodiment 5, layers may be distinguished (or identified) using two OCCs within the group. If one codeword is transmitted, antenna port, layer number or OCC information of an enabled codeword may be acquired using an NDI bit of a disabled codeword. If two codewords are enabled, two OCC resources available within the group may be used.

In the case in which a subgroup to which a MIMO transmission layer for a UE belongs is indicated as in Embodiment 6, layers may be distinguished (or identified) using two OCCs within the subgroup. If one codeword is transmitted, antenna port, layer number or OCC information of an enabled codeword may be acquired using an NDI bit of a disabled codeword. If two codewords are enabled, two OCC resources available within the subgroup may be used.

Figure 10:
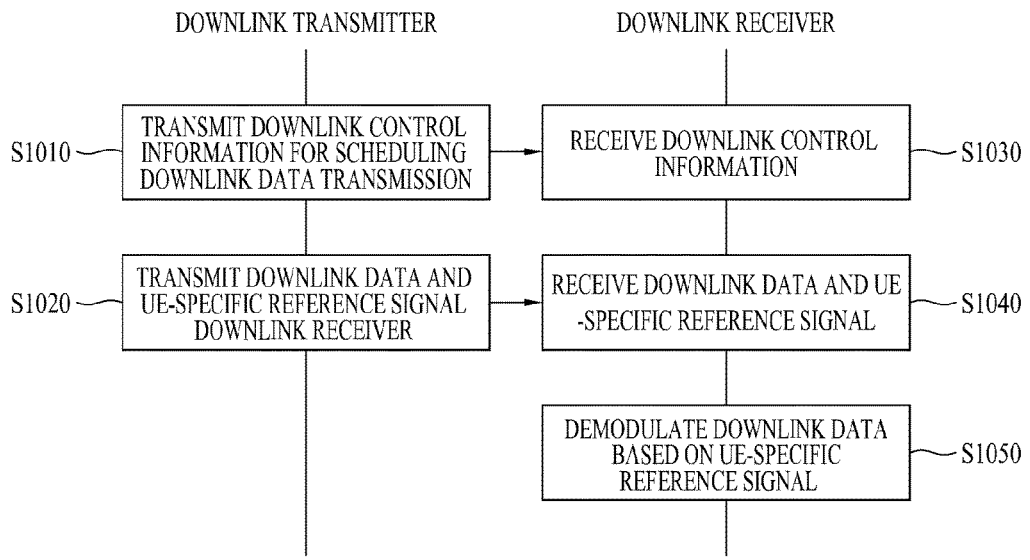
FIG. 10 is a diagram illustrating a method of transmitting and receiving a downlink signal according to an embodiment of the present invention.

A method of transmitting and receiving a downlink signal in a wireless communication system supporting MIMO transmission according to an embodiment of the present invention will be described with reference to FIG. 10. A downlink transmitter (e.g., a base station) of FIG. 10 may transmit a downlink signal via eight transmit antennas and a downlink receiver (e.g., a UE) may receive a downlink signal from the downlink transmitter. In addition, the downlink transmitter may be a relay for transmitting an access downlink signal to a UE and the downlink receiver may be a relay for receiving a backhaul downlink signal from a base station.

In step S1010, the downlink transmitter may transmit downlink control information. Then, in step S1030, the downlink receiver may receive the downlink control information. The downlink control information may be information for scheduling downlink data transmitted on N ($1 \leq N \leq 8$) layers. The downlink control information may be transmitted in a PDCCH DCI format.

In step S1020, the downlink transmitter may transmit downlink data and UE-specific reference signals (or DMRSs) transmitted on N layers based on the downlink control information of step S1010. The downlink data and the UE-specific reference signals may be multiplexed and transmitted on a PDCCH. Then, in step S1040, the downlink receiver may receive the downlink data and the UE-specific reference signals.

In step S1050, the downlink receiver may demodulate the downlink data transmitted on the N layers based on the UE-specific reference signals.

The downlink control information may include information for scheduling downlink MIMO transmission in the case in which only one codeword is enabled or in the case in which two codewords are enabled. The downlink control information may include information indicating the number N of layers to which enabled codewords are mapped. If the downlink transmitter includes eight transmit antennas, $1 \leq N \leq 8$. More specifically, transmission of 1 to 4 layers may be performed if only one codeword is enabled and transmission of 2 to 8 layers may be performed if two codewords are enabled. The number of layers may indicate rank. For example, the downlink control information may include the control information shown in Tables 40 to 44 or Tables 48 to 51.

Information indicating the number of layers in the downlink control information may include information about codes for identifying the UE-specific reference signals, that is, information for distinguishing the UE-specific reference signals transmitted at the same RE position. For example, as in the reference signal group "C" of FIG. 8($a$), four different UE-specific reference signals transmitted at the same RE position may be included in one reference signal group, one reference group may be divided into two subgroups by information about the codes for identifying the UE-specific reference signals, and one subgroup may include two UE-specific reference signals divided by orthogonal codes. For example, as shown in Table 48, information indicating the number of layers may have 3 bits and information indicating a subgroup to which a layer belongs (that is, information indicating codes for identifying the UE-specific reference signals) may be included together with respect to the case in which one codeword is mapped to one layer and two codewords are mapped to two layers. In addition, the downlink control information may further include information indicating a downlink MIMO transmission antenna port.

The matters described in the various embodiments of the present invention above (that is, various DCI format configuration methods proposed by the present invention) are equally applicable to the method of transmitting and receiving the downlink signal of the present invention described with reference to FIG. 10. For example, as in Embodiments 5 and 6, in a system supporting MIMO transmission of a maximum of rank 8, in the configuration of a DCI format for DMRS based data transmission with respect to each UE, a method of configuring control information so as to simultaneously support SU-MIMO and MU-MIMO (that is, using one DCI format) is used. Such information may include at least one of information indicating a group (that is, a reference signal position) to which a dedicated reference signal allocated to a UE belongs, information indicating transmission rank (the number of layers) of the UE, information indicating total transmission rank and information indicating a transmission layer of the UE. The information indicating the transmission layer can distinguish (or identify) a dedicated reference signal for demodulating data transmitted via the layer (or the antenna port) and a dedicated reference signal for demodulating data transmitted via another layer. Such control information may be included in the modified format of the DCI format 2A, which is proposed by the present invention, and a new DCI format.

Figure 11:
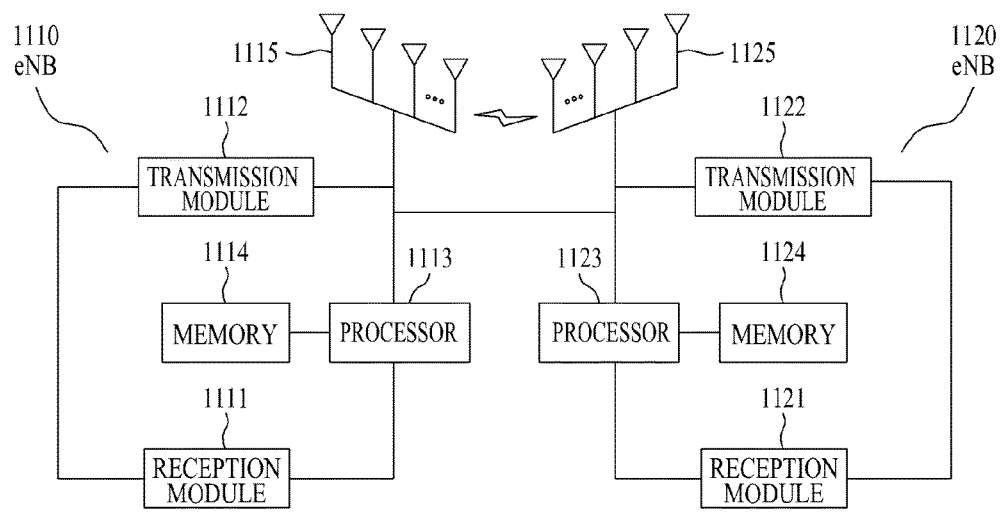
FIG. 11 is a diagram showing the configuration of a base station and a UE according to an exemplary embodiment of the present invention.

FIG. 11 is a diagram showing the configuration of a base station 1110 and a UE 1120 according to an exemplary embodiment of the present invention.

Referring to FIG. 11, the base station 1110 according to the present invention may include a reception module 1111, a transmission module 1112, a processor 1113, a memory 1114 and a plurality of antennas 1115. The use of the plurality of antennas 1115 means that the base station supports MIMO transmission. The reception module 1111 may receive a variety of signals, data and information from the UE in downlink. The transmission module 1112 may transmit a variety of signals, data and information to the UE in uplink. The processor 1113 may control the overall operation of the base station 1110.

The base station 1110 according to the embodiment of the present invention may operate in a wireless communication system supporting downlink MIMO transmission and support SU-MIMO or MU-MIMO transmission. The processor 1113 of the base station 1110 may be configured to transmit downlink control information including information indicating the number of layers, to which one or two enabled codewords of downlink MIMO transmission are mapped, through the transmission module 1112. The processor 1113 of the base station 1110 may be configured to transmit downlink data transmitted on one or more layers and DMRSs of the one or more layers through the transmission module 1111 based on downlink control information. The information indicating the number of layers may further include information about codes for identifying DMRSs.

The processor 1113 of the base station 1110 processes information received from the base station 1110 and information to be transmitted to an external device, and the memory 1114 stores the processed information for a predetermined time and may be replaced with a component such as a buffer (not shown).

Referring to FIG. 11, the UE 1120 according to the present invention may include a reception module 1121, a transmission module 1122, a processor 1123, a memory 1124 and a plurality of antennas 1125. The use of the plurality of antennas 1125 means that the UE supports MIMO transmission. The reception module 1121 may receive a variety of signals, data and information from the base station in downlink. The transmission module 1122 may transmit a variety of signals, data and information to the base station in uplink. The processor 1123 may control the overall operation of the UE 1120.

The UE 1120 according to the embodiment of the present invention may operate in a wireless communication system supporting downlink MIMO transmission. The processor 1123 of the base station 1120 may be configured to receive downlink control information including information indicating the number of layers, to which one or two enabled codewords of downlink MIMO transmission are mapped, through the reception module 1121. The processor 1123 of the base station 1120 may be configured to receive downlink data transmitted on one or more layers and DMRSs of the one or more layers through the reception module 1121 based on downlink control information. The information indicating the number of layers may further include information about codes for identifying DMRSs.

The processor 1123 of the UE 1120 processes information received from the UE 1120 and information to be transmitted to an external device, and the memory 1124 stores the processed information for a predetermined time and may be replaced with a component such as a buffer (not shown).

In the wireless communication system supporting multiple carriers, the following matters are commonly applicable to transmission of uplink control information from the UE 1120 to the base station 1110. Information about codes for identifying DMRSs may distinguish DMRSs transmitted at the same RE position and may be included in the information indicating the number of layers only when one codeword is mapped to one layer and when two codewords are mapped to two layers. Four different UE-specific reference signals transmitted at the same RE position may be included in one DMRS group, and one DMRS group is divided into two subgroups by the information about the codes for identifying the DMRSs, and one subgroup includes two DMRSs divided by orthogonal codes. In addition, the downlink control information may further include information indicating antenna ports of the downlink MIMO transmission. The information indicating the number of layers may have 3 bits.

The detailed configuration of the base station or the UE may be implemented by equally applying the matters (that is, various DCI format configuration methods proposed by the present invention) described in the various embodiments of the present invention.

In the description of FIG. 11, the description of the base station 1110 is equally applicable to an RN as a downlink transmitter or an uplink receiver and the description of the UE 1120 is equally applicable to an RN as a downlink receiver or an uplink transmitter.

The embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

INDUSTRIAL APPLICABILITY

The above-described embodiments of the present invention are applicable to various mobile communication systems supporting MIMO transmission.

The invention claimed is:

1. A method of receiving, at a user equipment (UE), a downlink signal from a base station in a wireless communication system supporting downlink multiple-input multiple-output (MIMO) transmission, the method comprising:
receiving downlink control information including an indication field indicating one state among a plurality of states respectively indicating different number of layers where one or two enabled codewords of downlink MIMO transmission are mapped or identical number of layers where the one or two enabled codewords of downlink MIMO transmission are mapped and different information identifying UE-specific reference signals for demodulating the downlink data; and
receiving downlink data based on the downlink control information.

2. The method of claim 1, wherein the one state indicated by the indication field indicates that the number of layers is 1, 2, 3 or 4 when one codeword is enabled, and
wherein the one state indicated by the indication field indicates the number of layers is 2, 3, 4, 5, 6, 7 or 8 when two codewords are enabled.

3. The method of claim 1, wherein when one codeword is enabled and the one state indicated by the indication field indicates that the number of layers is 1, the one state further indicates different information identifying UE-specific reference signals for demodulating the downlink data from another state among the plurality of states.

4. The method of claim 1, wherein when two codewords are enabled and the one state indicated by the indication field indicates that the number of layers is 2, the one state further indicates different information identifying UE-specific reference signals for demodulating the downlink data from another state among the plurality of states.

5. The method of claim 1, wherein the number of a plurality of states is up to 8.

6. A user equipment (UE) for receiving downlink signals from a base station in a wireless communication system supporting multiple-input multiple-output (MIMO) transmission, the UE comprising:
a receiver that receives downlink signals from the base station; and
a processor that controls the UE including the receiver, wherein the processor:
receives, through the receiver, downlink control information including an indication field indicating one state among a plurality of states respectively indicating different number of layers where one or two enabled codewords of downlink MIMO transmission are mapped or identical number of layers where the one or two enabled codewords of downlink MIMO transmission are mapped and different information identifying UE-specific reference signals for demodulating the downlink data, and,
receives, through the receiver, downlink data based on the downlink control information.

7. The UE of claim 6, wherein the one state indicated by the indication field indicates that the number of layers is 1, 2, 3 or 4 when one codeword is enabled, and
wherein the one state indicated by the indication field indicates the number of layers is 2, 3, 4, 5, 6, 7 or 8 when two codewords are enabled.

8. The UE of claim 6, wherein when one codeword is enabled and the one state indicated by the indication field indicates that the number of layers is 1, the one state further indicates different information identifying UE-specific reference signals for demodulating the downlink data from another state among the plurality of states.

9. The UE of claim 6, wherein when two codewords are enabled and the one state indicated by the indication field indicates that the number of layers is 2, the one state further indicates different information identifying UE-specific reference signals for demodulating the downlink data from another state among the plurality of states.

10. The UE of claim 6, wherein the number of a plurality of states is up to 8.

11. A method of transmitting, at a base station, a downlink signal to a user equipment (UE) in a wireless communication system supporting downlink multiple-input multiple-output (MIMO) transmission, the method comprising:
transmitting downlink control information including an indication field indicating one state among a plurality of states respectively indicating different number of layers where one or two enabled codewords of downlink MIMO transmission are mapped or identical number of layers where the one or two enabled codewords of downlink MIMO transmission are mapped and different information identifying UE-specific reference signals for demodulating the downlink data; and
transmitting downlink data based on the downlink control information.

12. The method of claim 11, wherein the one state indicated by the indication field indicates that the number of layers is 1, 2, 3 or 4 when one codeword is enabled, and
wherein the one state indicated by the indication field indicates the number of layers is 2, 3, 4, 5, 6, 7 or 8 when two codewords are enabled.

13. The method of claim 11, wherein when one codeword is enabled and the one state indicated by the indication field indicates that the number of layers is 1, the one state further indicates different information identifying UE-specific reference signals for demodulating the downlink data from another state among the plurality of states.

14. The method of claim 11, wherein when two codewords are enabled and the one state indicated by the indication field indicates that the number of layers is 2, the one state further indicates different information identifying UE-specific reference signals for demodulating the downlink data from another state among the plurality of states.

15. The method of claim 11, wherein the number of a plurality of states is up to 8.

16. A base station for transmitting downlink signals to a user equipment (UE) in a wireless communication system supporting multiple-input multiple-output (MIMO) transmission, the base station comprising:
- a transmitter that transmits downlink signals to the UE; and
- a processor that controls the base station including the transmitter,
- wherein the processor:
- transmits, through the transmitter, downlink control information including an indication field indicating one state among a plurality of states respectively indicating different number of layers where one or two enabled codewords of downlink MIMO transmission are mapped or identical number of layers where the one or two enabled codewords of downlink MIMO transmission are mapped and different information identifying UE-specific reference signals for demodulating the downlink data, and
- transmits, through the transmitter, downlink data based on the downlink control information.

17. The base station of claim 16, wherein the one state indicated by the indication field indicates that the number of layers is 1, 2, 3 or 4 when one codeword is enabled, and
   wherein the one state indicated by the indication field indicates the number of layers is 2, 3, 4, 5, 6, 7 or 8 when two codewords are enabled.

18. The base station of claim 16, wherein when one codeword is enabled and the one state indicated by the indication field indicates that the number of layers is 1, the one state further indicates different information identifying UE-specific reference signals for demodulating the downlink data from another state among the plurality of states.

19. The base station of claim 16, wherein when two codewords are enabled and the one state indicated by the indication field indicates that the number of layers is 2, the one state further indicates different information identifying UE-specific reference signals for demodulating the downlink data from another state among the plurality of states.

20. The base station of claim 16, wherein the number of a plurality of states is up to 8.

* * * * *